US009014313B2

(12) United States Patent
Chmelar

(10) Patent No.: US 9,014,313 B2
(45) Date of Patent: Apr. 21, 2015

(54) ERROR SIGNATURE ANALYSIS FOR DATA AND CLOCK RECOVERY IN A COMMUNICATION SYSTEM

(75) Inventor: Erik V. Chmelar, Midland, MI (US)

(73) Assignee: LSI Corporation, San Jose, CA (US)

( * ) Notice: Subject to any disclaimer, the term of this patent is extended or adjusted under 35 U.S.C. 154(b) by 554 days.

(21) Appl. No.: 13/368,314

(22) Filed: Feb. 7, 2012

(65) Prior Publication Data

US 2013/0202064 A1  Aug. 8, 2013

(51) Int. Cl.
*H03D 1/04* (2006.01)
*H03K 5/01* (2006.01)
*H04L 25/08* (2006.01)
*H04L 25/03* (2006.01)

(52) U.S. Cl.
CPC ................ *H04L 25/03057* (2013.01)

(58) Field of Classification Search
USPC ............... 375/229–236, 240, 240.02–240.07, 375/240.26–240.29, 284, 285, 316, 324, 375/326, 346, 347, 348, 349, 350, 351, 342
See application file for complete search history.

(56) References Cited

U.S. PATENT DOCUMENTS

| 7,606,293 | B2 | 10/2009 | Kim et al. |
| 7,956,790 | B2 | 6/2011 | Chmelar et al. |
| 7,973,692 | B2 | 7/2011 | Chmelar et al. |
| 2005/0084046 | A1 | 4/2005 | Seo |
| 2007/0237245 | A1* | 10/2007 | Finkelstein et al. ......... 375/260 |
| 2009/0303093 | A1* | 12/2009 | Gribok et al. ............... 341/141 |
| 2009/0303096 | A1* | 12/2009 | Chmelar ..................... 341/160 |
| 2009/0304066 | A1 | 12/2009 | Chmelar et al. |
| 2011/0032976 | A1 | 2/2011 | Hou et al. |
| 2011/0052216 | A1 | 3/2011 | Jiang et al. |
| 2011/0115660 | A1* | 5/2011 | Singer et al. ................. 341/155 |
| 2011/0150060 | A1 | 6/2011 | Huang et al. |
| 2012/0099679 | A1* | 4/2012 | Yamada et al. .............. 375/341 |
| 2013/0003901 | A1* | 1/2013 | Kato et al. .................... 375/341 |
| 2013/0028312 | A1 | 1/2013 | Tsai |
| 2013/0107996 | A1* | 5/2013 | Hewavithana et al. ....... 375/350 |

(Continued)

OTHER PUBLICATIONS

Pola, A., et al., "A New Low Complexity Iterative Equalization Architecture for High-Speed Receivers on Highly Dispersive Channels: Decision Feedforward Equalizer (DFFE)", IEEE Int. Symp. Circuits and Systems (ISCAS), pp. 133-136 (May 2011), USA.

(Continued)

*Primary Examiner* — Sam K Ahn
*Assistant Examiner* — Linda Wong
(74) *Attorney, Agent, or Firm* — Suiter Swantz pc llo

(57) ABSTRACT

Described embodiments recover timing and data information from a signal received via a communication channel. An analog-to-digital converter (ADC) operating at a baud rate of the communication channel generates an actual ADC value corresponding to each bit sample of the received signal. A fast symbol estimation module estimates, based on the actual ADC value, a bit value corresponding to each bit sample. The fast symbol estimation module operates at a digital clock rate. The estimated bit values are provided to a timing recovery module. An ADC reconstruction module, based on a first number of pre-cursor estimated bit values, an estimated cursor bit value, and a second number of post-cursor estimated bit values, generates a reconstructed ADC value corresponding to each bit sample. Based on the reconstructed ADC values, the estimated bit values, and the actual ADC values, a corrected bit value is generated for each bit sample.

26 Claims, 20 Drawing Sheets

(56) References Cited

U.S. PATENT DOCUMENTS

2013/0202064 A1    8/2013   Chmelar
2013/0272698 A1*  10/2013   Jin et al. ............ 398/43

OTHER PUBLICATIONS

E. Chmelar, "Error Signature Analysis: A Receiver Architecture for Data Communication", Presented at DesignCon 2012, Wednesday, Feb. 1, 2012, session No. 10-WA3 (USA).

B. Wang, et al., "A programmable pre-cursor ISI equalization circuit for high-speed serial link over highly lossy backplane channel," Canadian Conf. Electrical and Computer Engineering, pp. 1221-1226, May 2009.

J. Ren, et al., "Precursor ISI reduction in high-speed I/O," IEEE Symp. VLSI Circuits, pp. 134-135, Jun. 2007.

Q. Shaolei, F. Zhong, et al. "A 1.0625-to-14.025Gb/s multimedia transceiver with full-rate source-series-terminated transmit driver and floating-tap decision-feedback equalizer in 40nm CMOS." Solid-State Circuits Conf. Dig. of Tech. Papers, pp. 348-350, 2011.

S. Quan, F. Zhong, et al. "A 1.0625-to-14.025Gb/s multimedia transceiver with full-rate source-series-terminated transmit driver and floating-tap decision-feedback equalizer in 40nm CMOS." Solid-State Circuits Conf. Dig. of Tech. Papers, pp. 348-350, 2011.

* cited by examiner

100

200

302

312

400

500

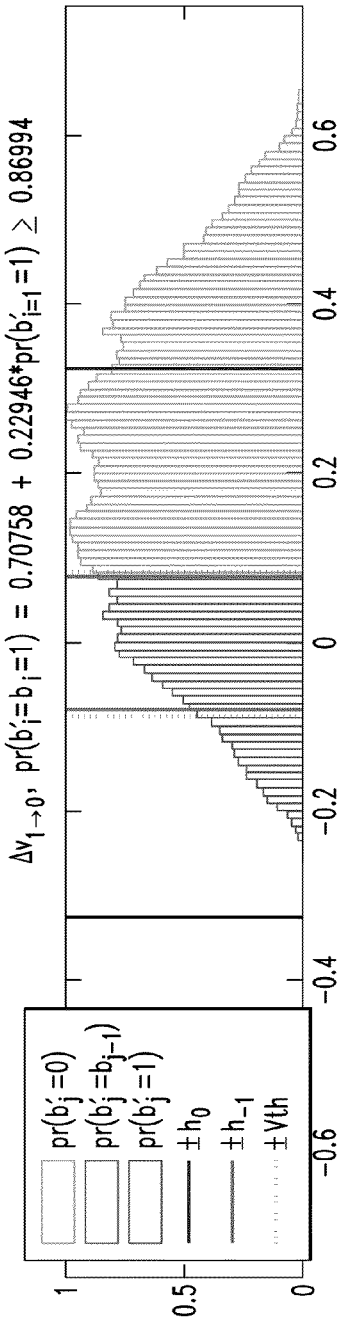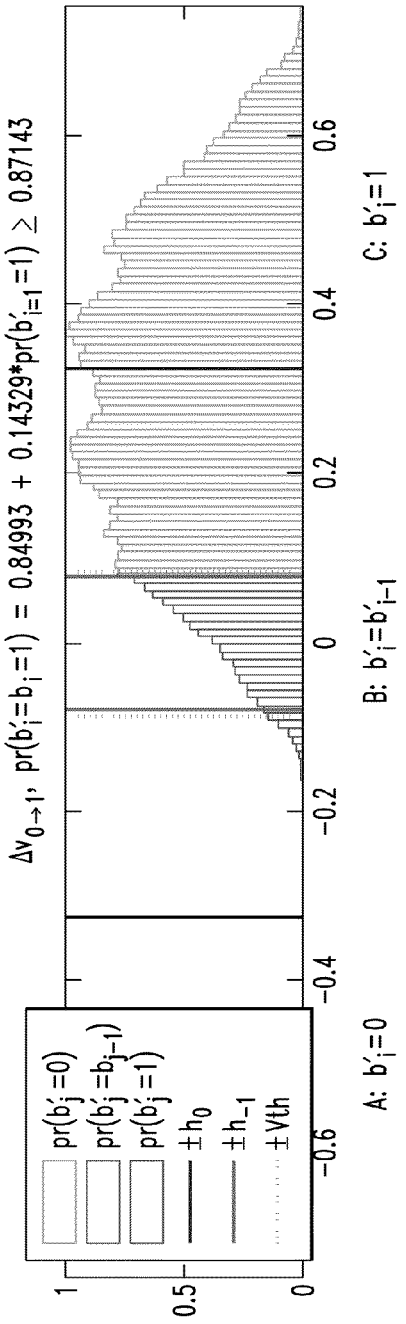

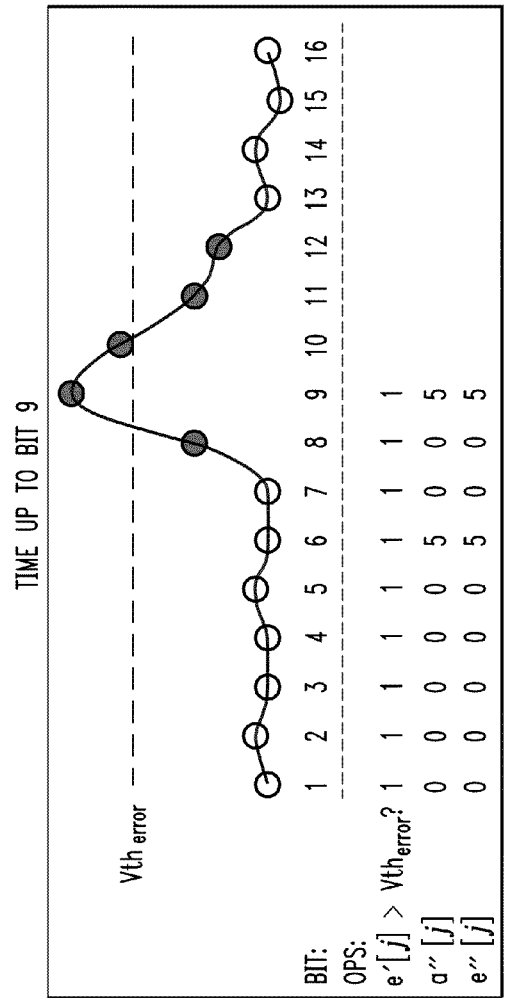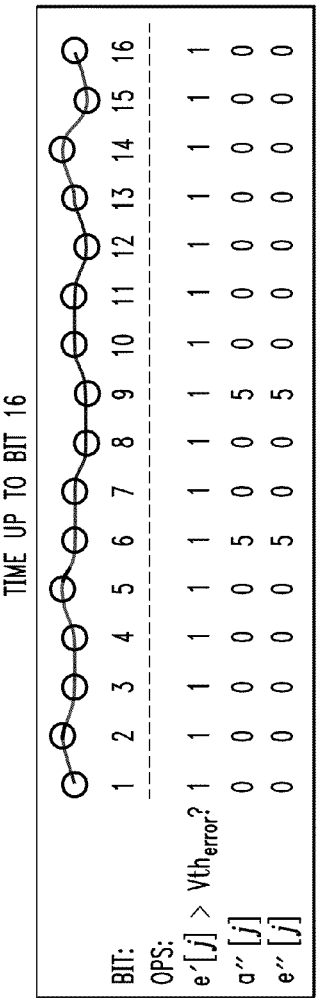
FIG. 12B
FIG. 12C

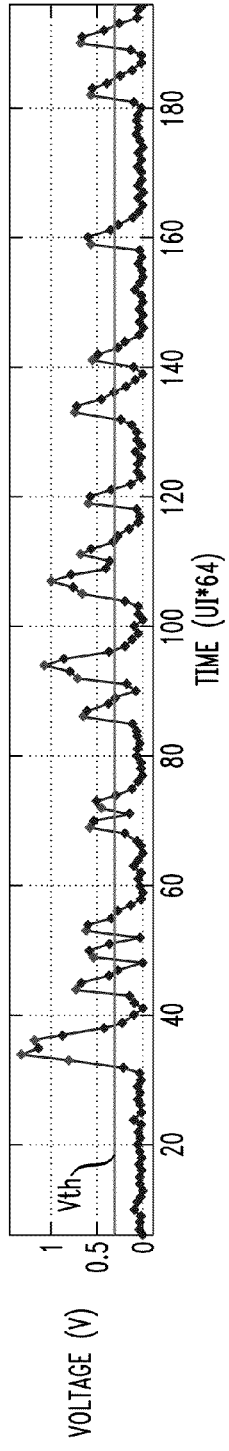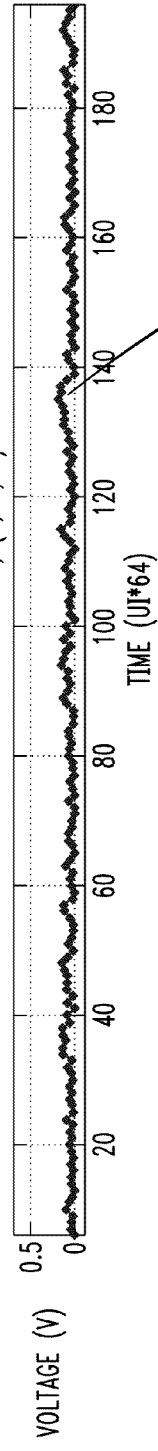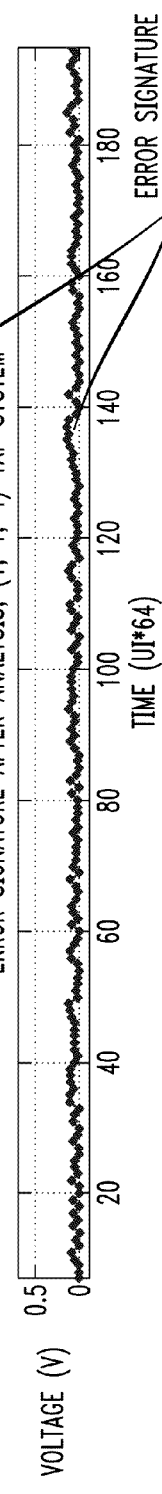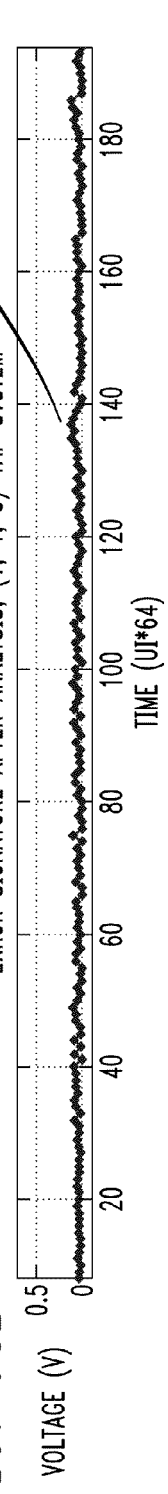
FIG. 13A
FIG. 13B
FIG. 13C
FIG. 13D

1700

ERROR SIGNATURE ANALYSIS FOR DATA AND CLOCK RECOVERY IN A COMMUNICATION SYSTEM

CROSS-REFERENCE TO RELATED APPLICATIONS

The subject matter of this application is related to U.S. patent application Ser. No. 13/368,315 filed on Feb. 7, 2012, now issued as U.S. Pat. No. 8,615,062, the teachings of which are incorporated herein in their entireties by reference.

BACKGROUND

Digital communication receivers typically sample a received analog waveform and detect sampled data. In many data communication applications, Serializer and De-serializer (SERDES) devices facilitate the transmission between two points of parallel data across a serial link. Data at one point is converted from parallel data to serial data and transmitted through a communication channel to the second point where it is received and converted from serial data to parallel data. As clock rates of the serial links increase to meet demand for higher data throughput, transmitted signals arriving at a receiver are increasingly susceptible to corruption by frequency-dependent signal loss of the channel, such as intersymbol interference (ISI), and other noise, such as crosstalk, echo, signal dispersion and distortion.

Receivers often equalize the channel to compensate for such signal degradation to correctly decode the received signals. For example, a receiver might apply equalization to the analog received signal using an analog front-end (AFE) equalizer that acts as a filter having parameters initially based on an estimate of the channel's features. Since, in many cases, little information about the channel transfer function is available during initial signal acquisition, and since the pulse transfer function can vary with time, an equalizer with adaptive setting of parameters providing adjustable range might be employed to mitigate the degradation of the signal transmitted through the channel. Thus, once the signal is received, the analog filter parameters might be adapted based on information derived from the received analog signal.

A decision-feedback equalizer (DFE) is often used to remove ISI and other noise to determine a correct bit sequence from the received signal, and is often employed in conjunction with an AFE. Generally, a traditional DFE utilizes a nonlinear equalizer to equalize the channel using a feedback loop based on previously decided symbols from the received signal. Thus, a DFE typically determines a correct logic value of a given sample ("cursor value") of the input signal for a given symbol period in the presence of ISI based on one or more previous logic values ("pre-cursor values"). For example, a traditional DFE might subtract the sum of ISI contributions for a predetermined number of previously decoded symbols of the received signal. The ISI contributions might be determined by multiplying the previously decoded symbol values by their corresponding pulse response coefficients ("taps") of the communication channel. These products might be summed and subtracted from the received signal. Analog DFEs are generally capable of high bandwidth operation, but both power consumption and semiconductor area increase as the bandwidth increases.

Another type of DFE is an unrolled DFE such as described in U.S. Published Patent Application 2009/0304066, filed on Jun. 6, 2008 to Chmelar et al. (hereinafter "Chmelar"), which is incorporated by reference herein. For example, in the unrolled DFE of Chmelar, the feedback path is removed between the analog and digital domains that exists for a traditional DFE (e.g., the feedback path between the DFE and the AFE). The unrolled DFE precomputes the possible ISI contributions based on the received symbol history based on a first speculation that the result from processing the succeeding bit (i.e., a decision output) will be logic '1' and a second speculation that the result from processing the succeeding bit will be logic '0'. Once the result from the succeeding bit is available, the pre-calculated adjustment feedback value corresponding to the correctly speculated output value is selected to process the following input bits. In this way, latency between determination of a succeeding bit and providing a data dependent input for processing a following bit can be greatly reduced as the time required to perform adjustment calculations is effectively eliminated from the latency.

However, there are limitations of traditional DFEs and unrolled DFEs. For example, in both traditional and unrolled DFEs, pre-cursor ISI cannot be equalized since a DFE is a causal system and for a DFE to recover a symbol and feedback its ISI contribution to equalize the received signal, the symbol must have already been received and a DFE does not predict future symbols. This is an unfortunate limitation since both future symbols (pre-cursor) and past symbols (post-cursor) contribute to ISI. Although pre-cursor ISI was negligible at lower baud rates, as baud rates have increased to tens of gigabits per second through channels whose transmission properties have not improved proportionally, unequalized pre-cursor ISI has become increasingly significant in degrading the Bit Error Ratio (BER) of the system.

Further, a traditional DFE is limited to performing the ISI determination and subtraction in a single symbol period (a "unit interval" or UI). The UI is the baud rate of the SERDES channel, which can be in excess of 12 Gbps. This single UI timing requirement ("DFE iteration bound") dictates the maximum frequency at which the DFE can operate. To meet the DFE iteration bound at high baud rates, drive strength of some analog circuitry might be increased, which undesirably increases power consumption of the receiver. In an unrolled DFE, although the feedback between the AFE and the DFE is removed, the single UI iteration bound still limits the operation of the DFE. Further, unrolled DFEs might experience data recovery latency and exponential scaling of circuit complexity and power consumption with respect to ISI. Larger data recovery latency slows down the timing recovery loop of the receiver, thereby affecting the receiver's ability to extract and effectively track the transmitter's clock phase and frequency. The slowed timing loop sacrifices some tolerance to jitter in the received signal, which directly affects BER. Thus, it is beneficial that a SERDES receiver recover the transmitted symbols as quickly as possible to enable a fast timing recovery loop.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments recover timing and data information from a signal received via a communication channel. An analog-to-digital converter (ADC) operating at a baud rate of the communication channel generates an actual ADC value corresponding to each bit sample of the received signal. A fast symbol estimation module estimates, based on the actual ADC value, a bit value corresponding to each bit sample. The fast symbol estimation module operates at a digital clock rate. The estimated bit values are provided to a timing recovery module. An ADC reconstruction module, based on a first number of pre-cursor estimated bit values, an estimated cursor bit value, and a second number of post-cursor estimated bit values, generates a reconstructed ADC value corresponding to each bit sample. Based on the reconstructed ADC values, the estimated bit values, and the actual ADC values, a corrected bit value is generated for each bit sample.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

Other aspects, features, and advantages of embodiments of the present invention will become more fully apparent from the following detailed description, the appended claims, and the accompanying drawings in which like reference numerals identify similar or identical elements.

Figure 4:
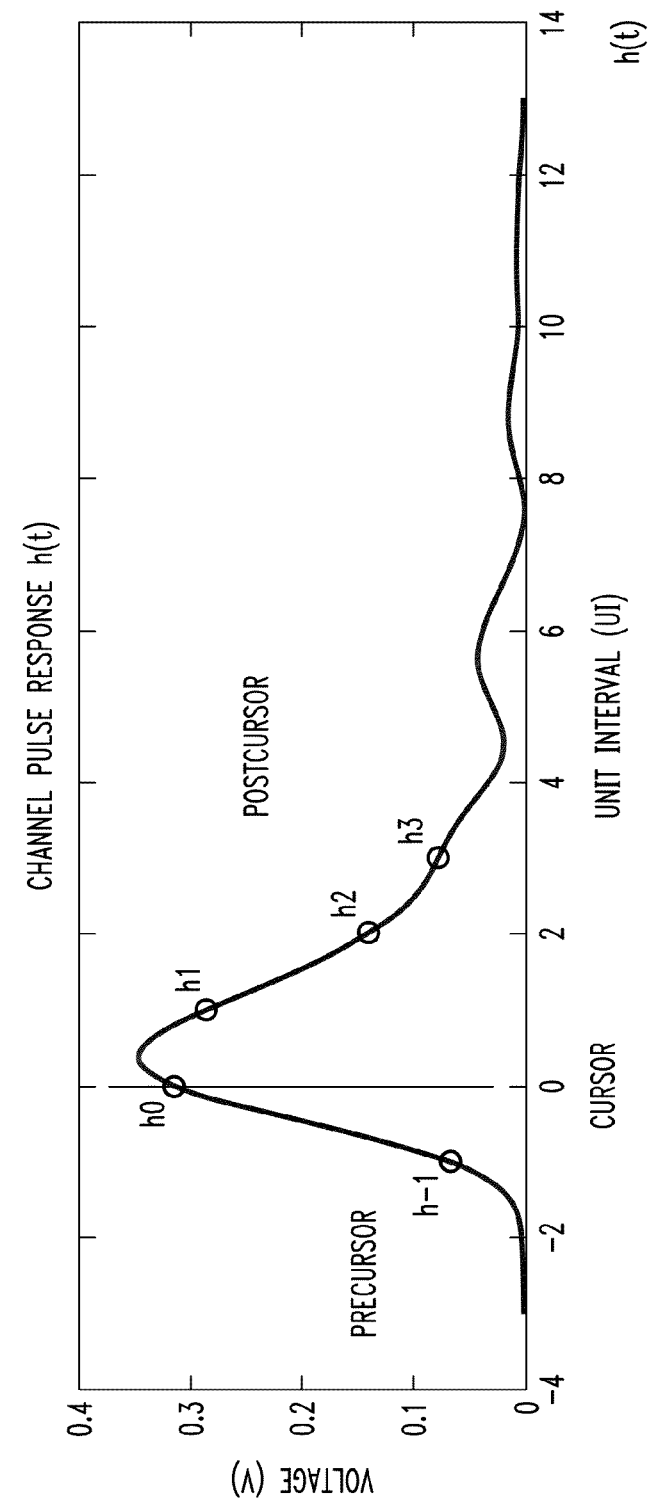
FIG. 4 shows an exemplary plot of the pulse response of the communication channel of the SERDES system of FIG. 1.
Figure 6:
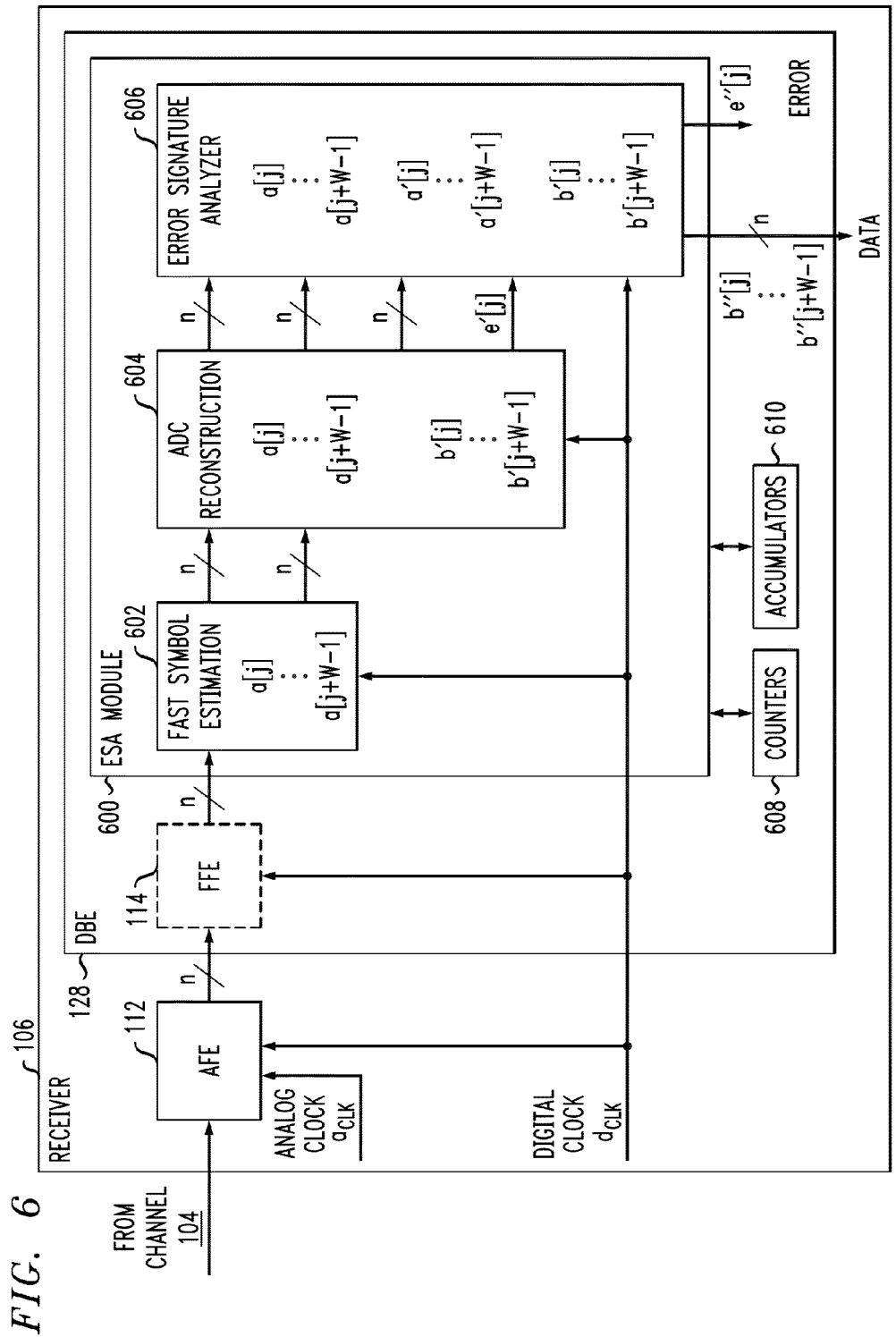
FIG. 6 shows an exemplary block diagram of an Error Signature Analysis (ESA) module of the receiver of the SERDES system of FIG. 1 in accordance with exemplary embodiments.
Figure 7A:
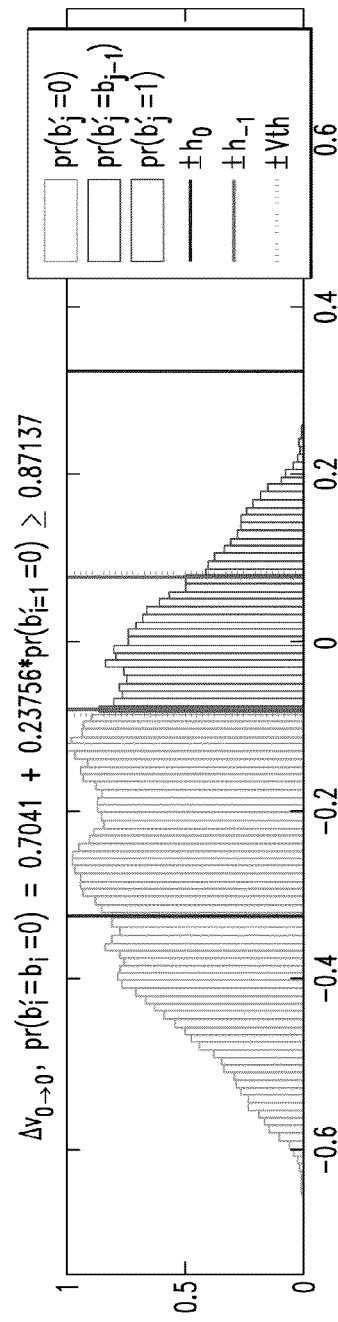
Figure 7B:
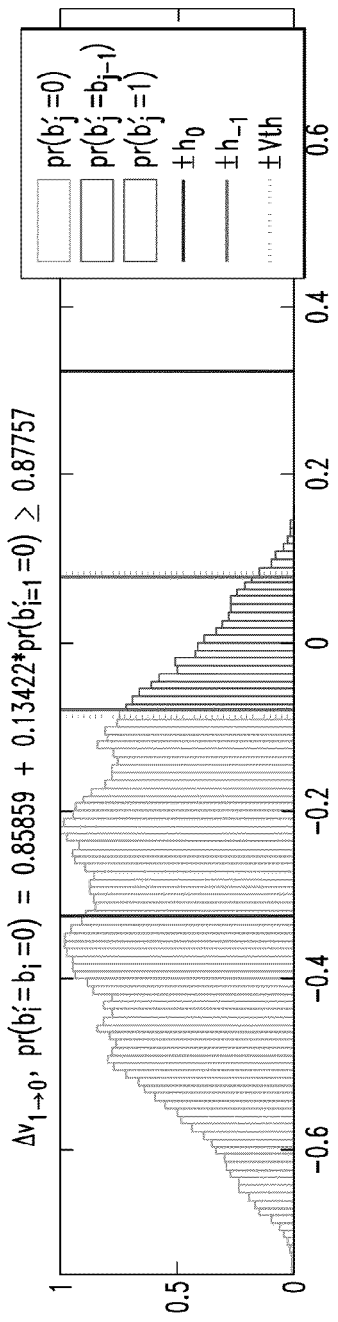
Figure 8:
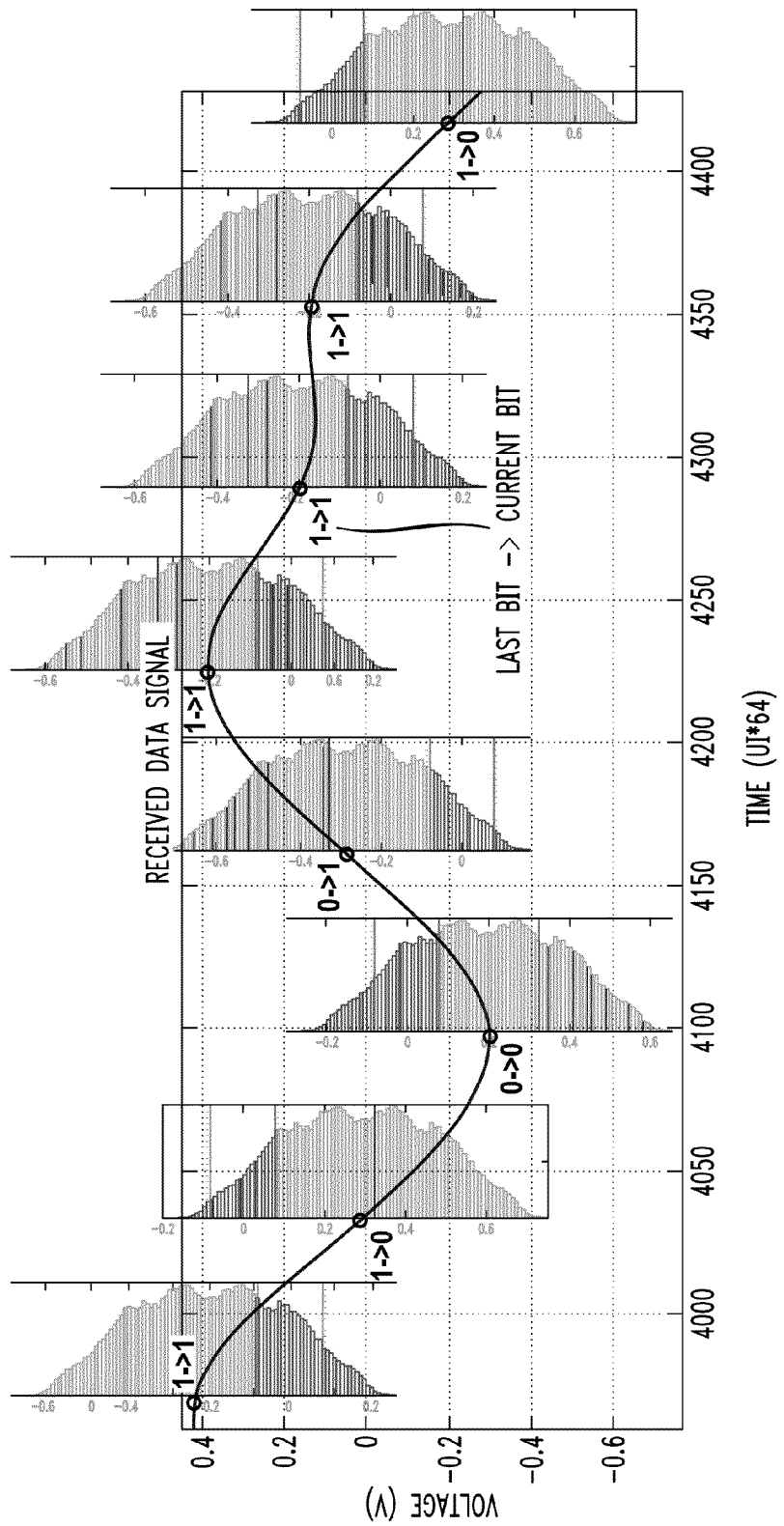
Figure 9A:
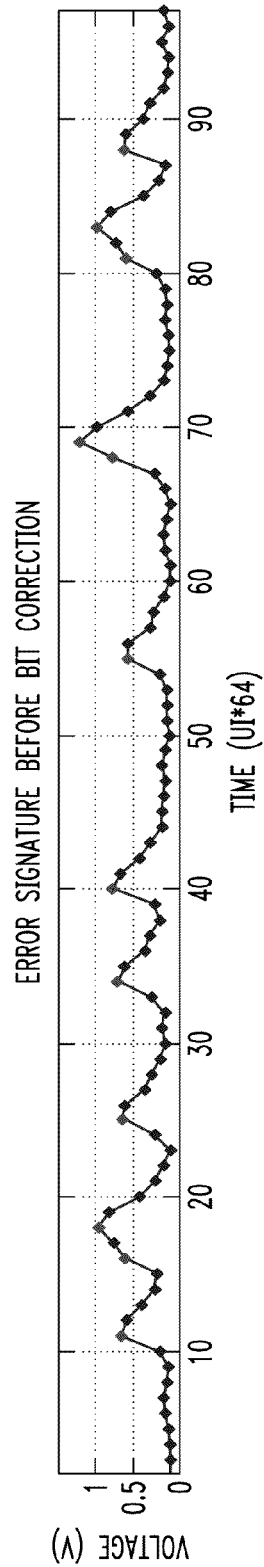
Figure 9B:
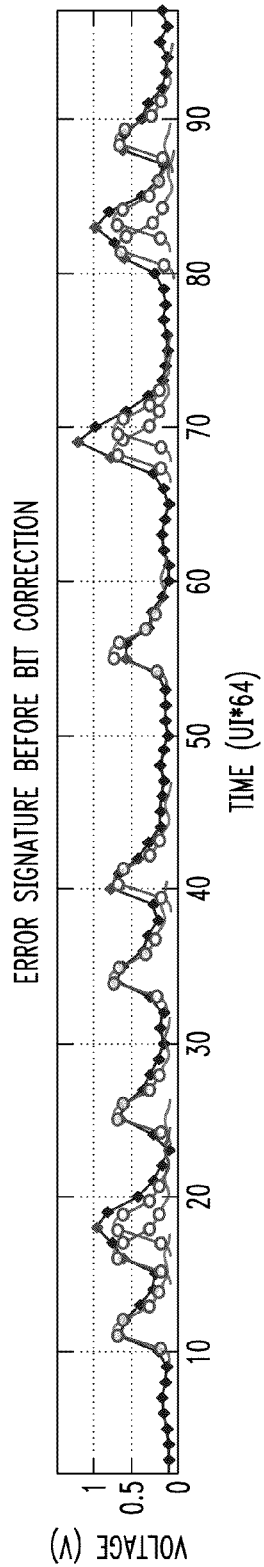
Figure 10:
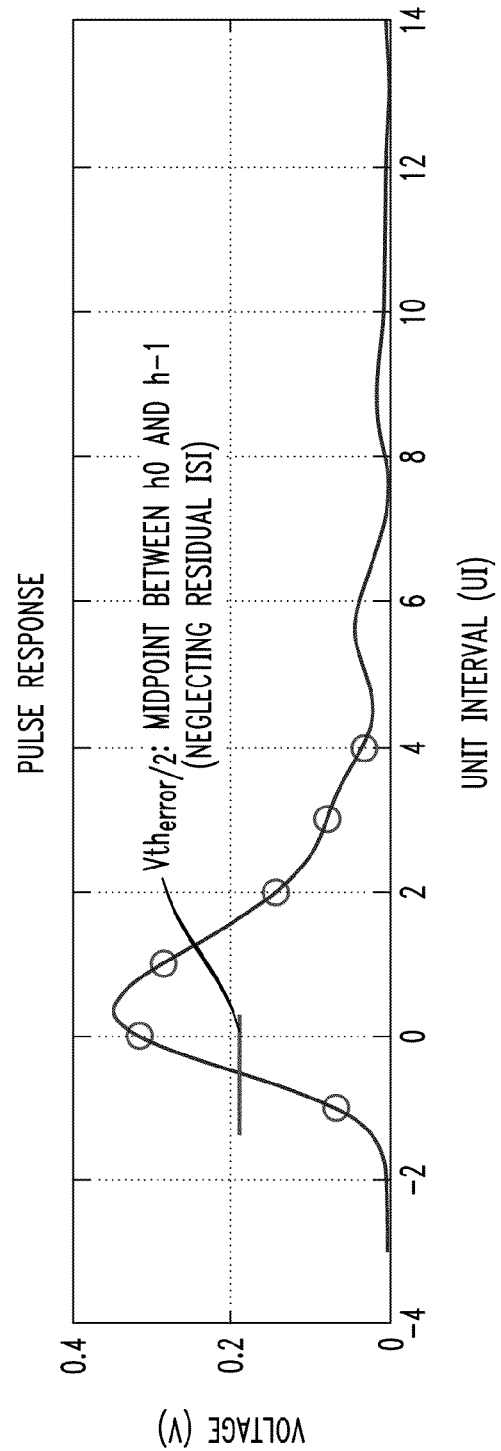
Figure 11A:
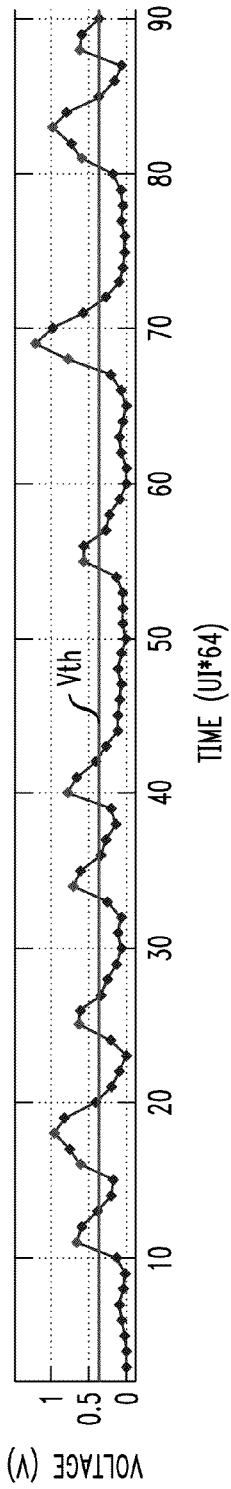
Figure 11B:
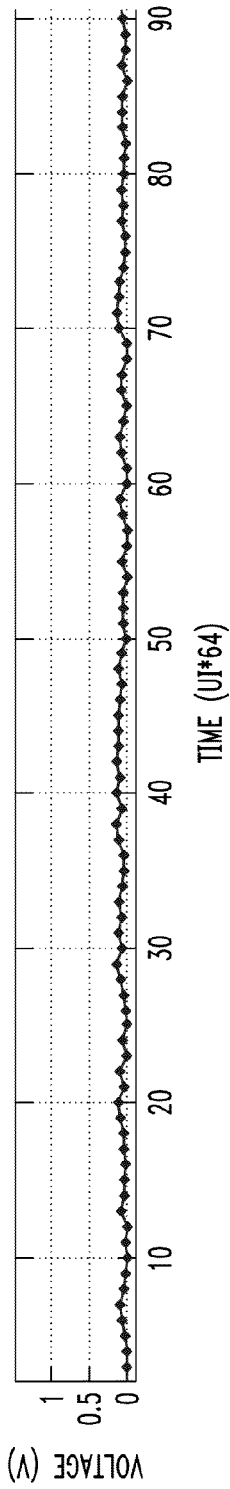
Figure 12A:
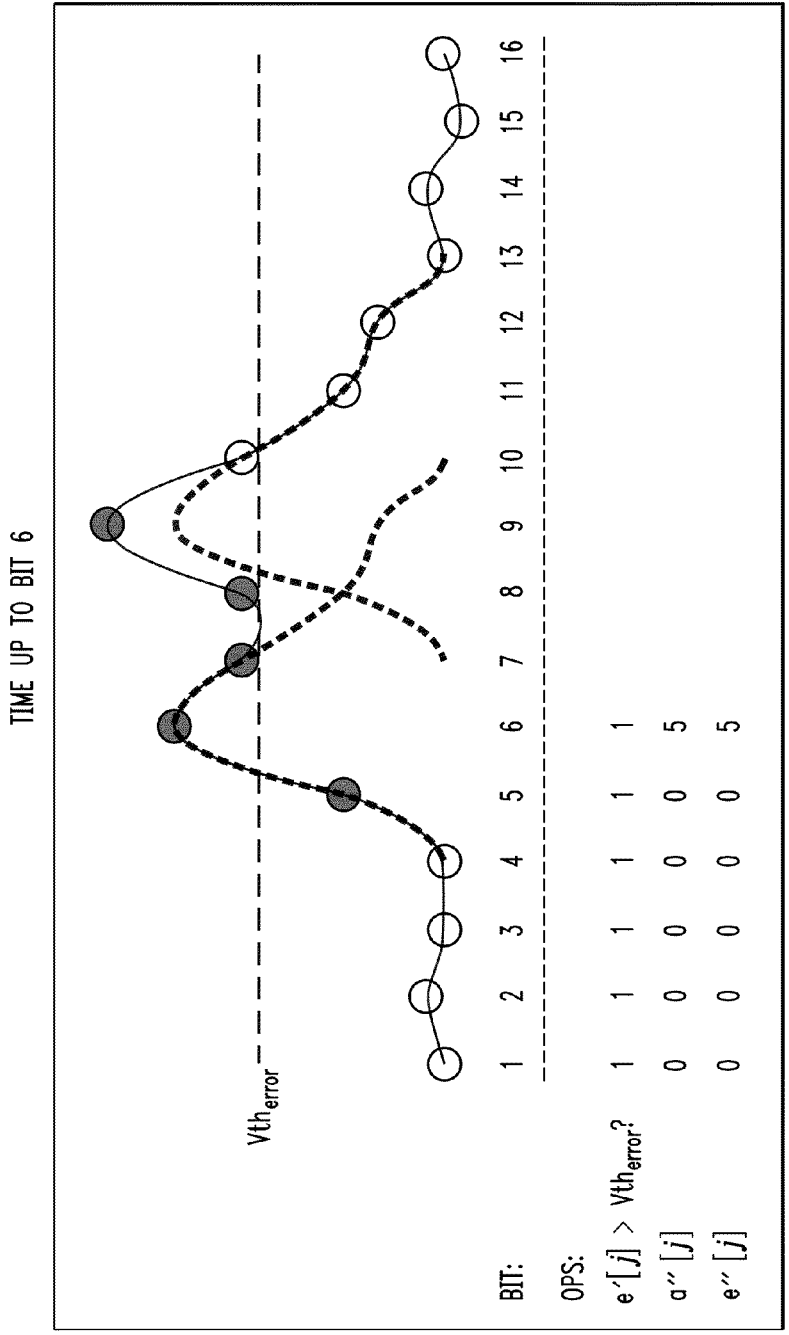
Figure 14:
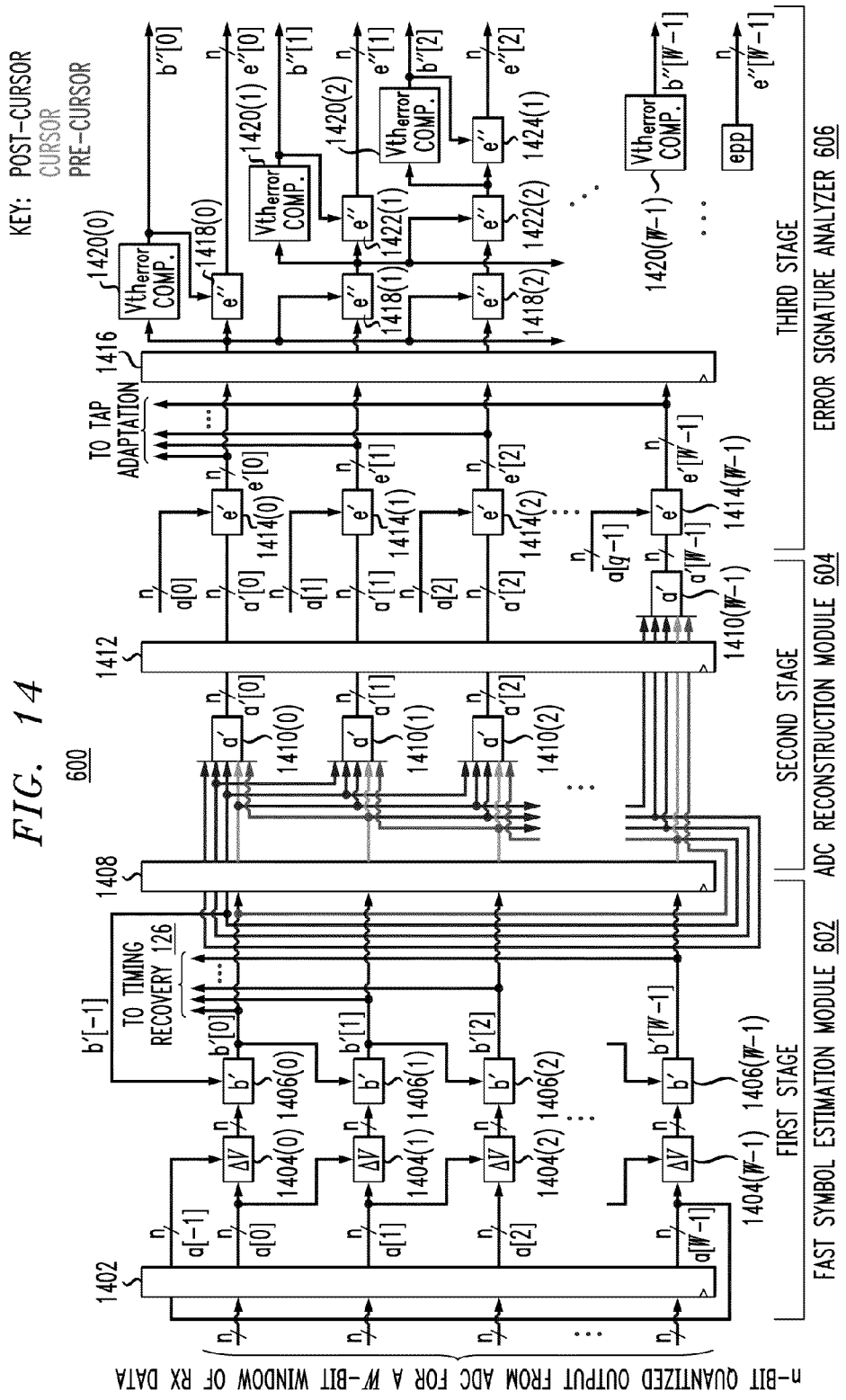
Figure 15:
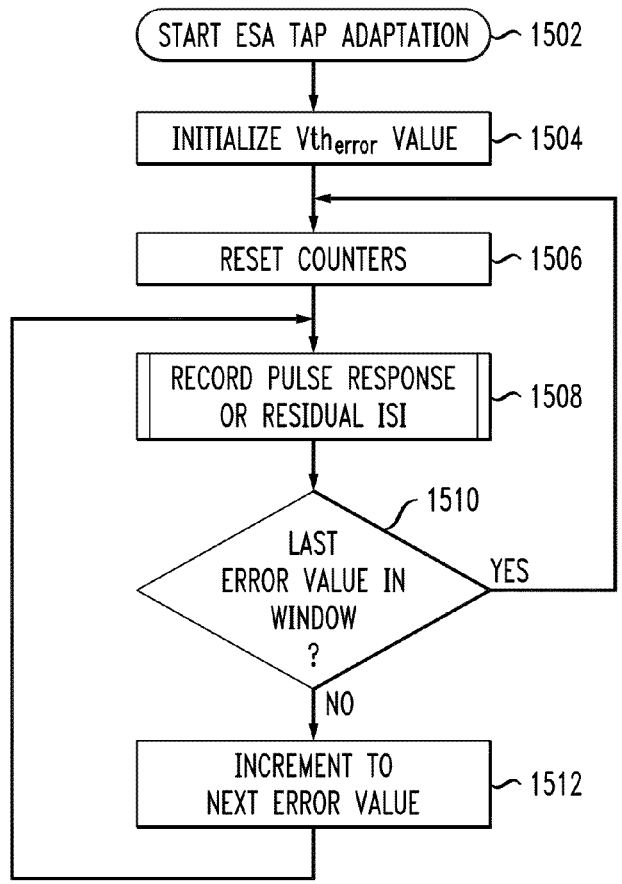
Figure 16:
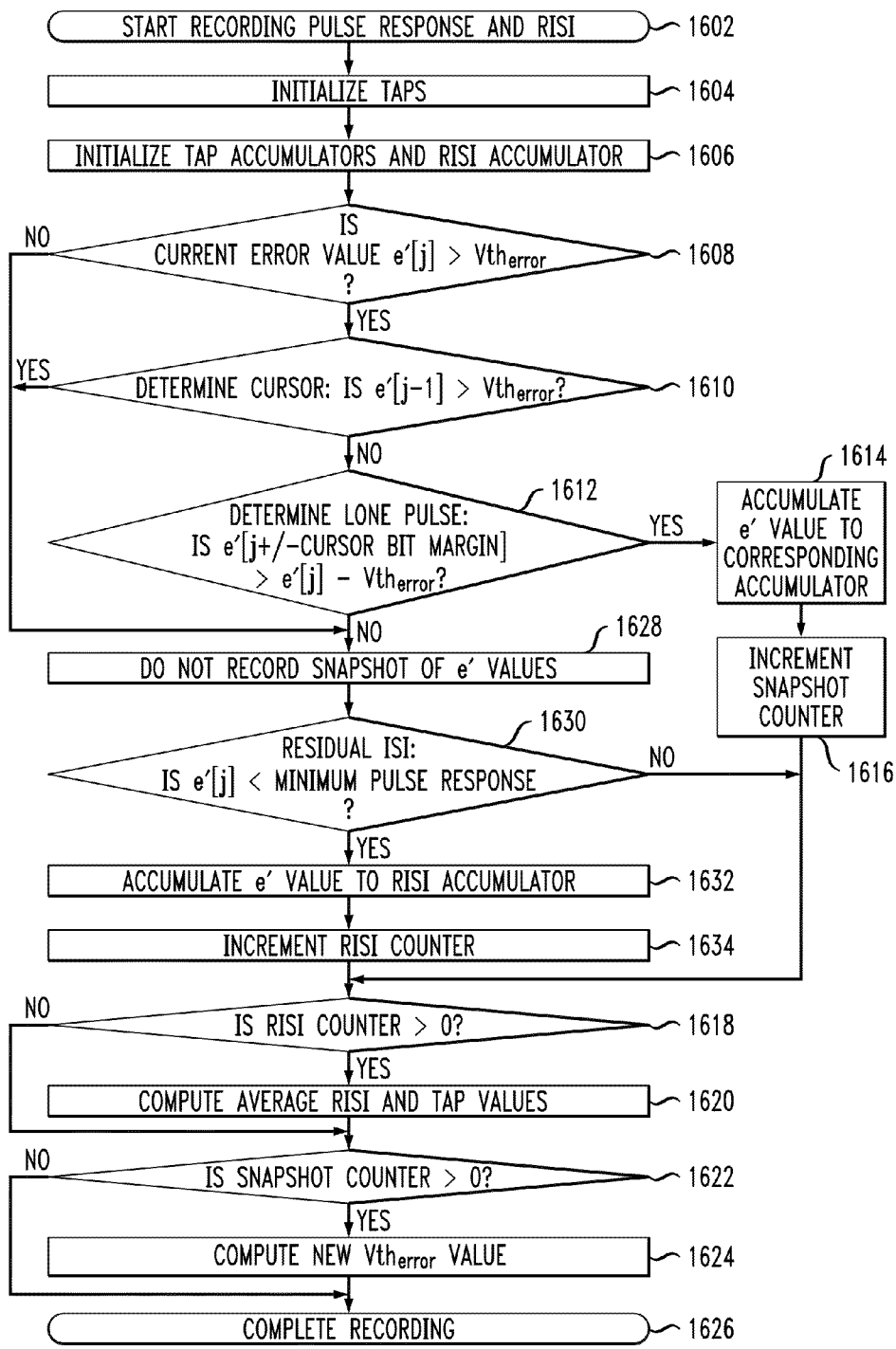
Figure 17:
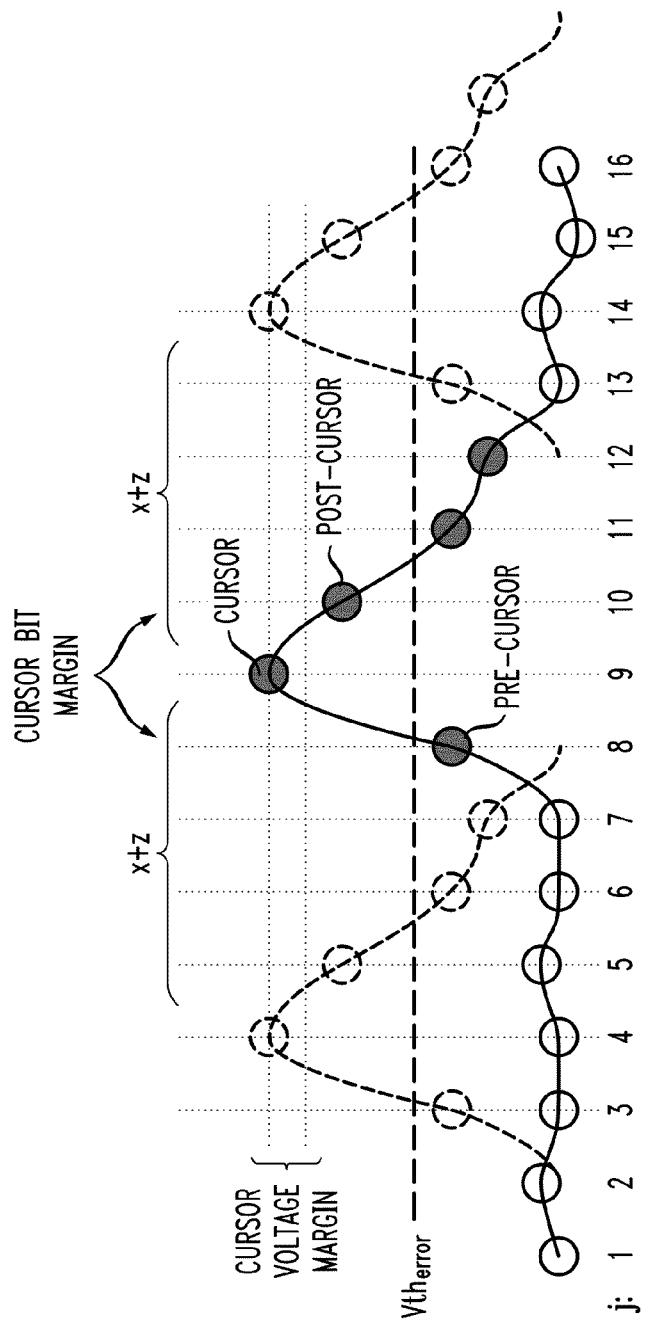
Figure 18:
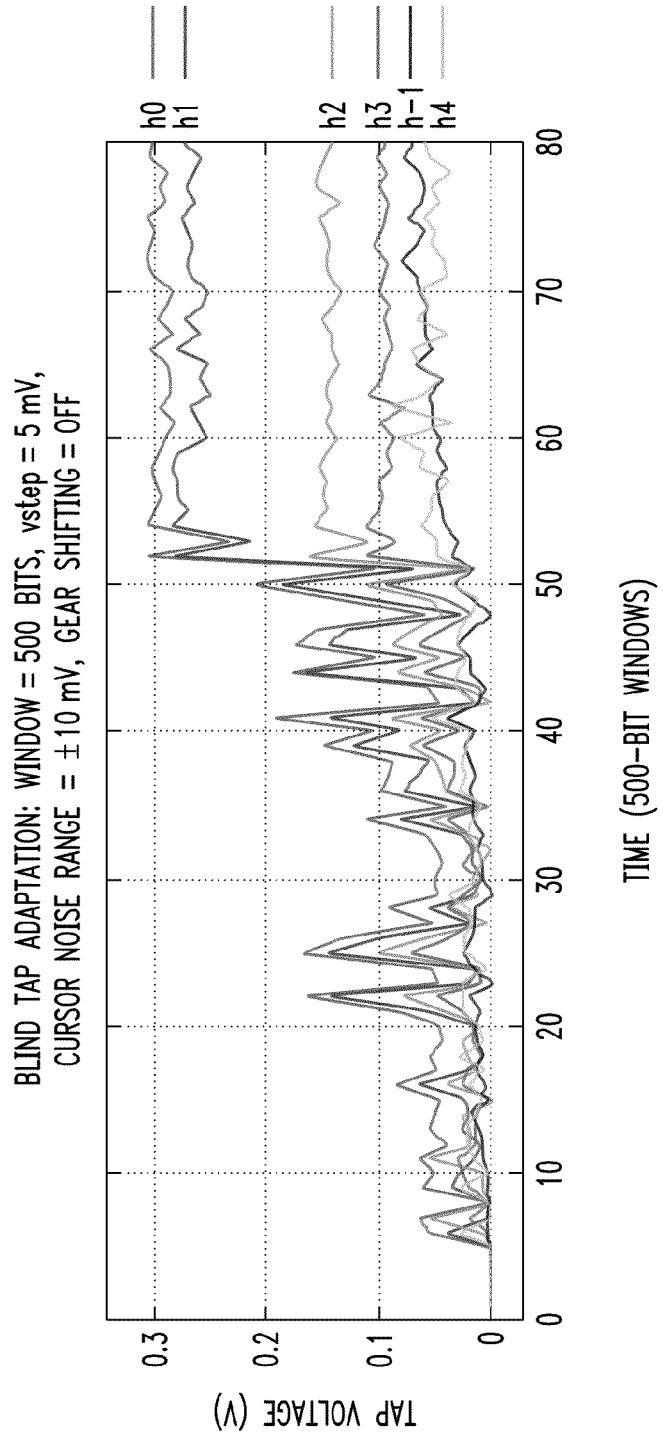

FIGS. 7A-D show exemplary plots of probability distribution functions (PDFs) of a threshold voltage of the ESA module of FIG. 6 for the four possible received 2-bit sequences in accordance with exemplary embodiments: FIG. 7A shows an exemplary PDF plot for bit sequence [00], FIG. 7B shows an exemplary PDF plot for bit sequence [10], FIG. 7C shows an exemplary PDF plot for bit sequence [11], and FIG. 7D shows an exemplary PDF plot for bit sequence [01];

FIG. 8 shows an exemplary received bit sequence with the corresponding PDFs of FIGS. 7A-D overlaid an exemplary received bit sequence of the ESA module of FIG. 6;

FIGS. 9A-B show an exemplary error signature resulting from an exemplary sequence of received bits for the ESA module of FIG. 6: FIG. 9A shows the exemplary error signature with erroneous bit estimations, and FIG. 9B shows the exemplary error signature with the scaled pulse responses of each received bit;

FIG. 10 shows an exemplary plot of the error threshold voltage of the ESA module of FIG. 6 with the pulse response of FIG. 4, in accordance with exemplary embodiments;

FIGS. 11A-B show exemplary plots of the error signature for the exemplary bit sequence from FIG. 19A: FIG. 11A shows the error signature before bit correction by the ESA module of FIG. 6, and FIG. 11B shows the error signature after bit correction by the ESA module of FIG. 6;

FIGS. 12A-C show a time progression of bit correction operations in the ESA module of FIG. 6 in accordance with exemplary embodiments: FIG. 12A shows the exemplary time progression up to bit 6, FIG. 12B shows the exemplary time progression up to bit 9, and FIG. 12C shows the exemplary time progression up to bit 16;

FIGS. 13A-D show the error signature of the ESA module of FIG. 6 as the number of taps varies: FIG. 13A shows the error signature before bit correction, FIG. 13B shows the error signature after correction in an exemplary (1,1,3)-tap system, FIG. 13C shows the error signature after correction in an exemplary (1,1,4)-tap system, and FIG. 13D shows the error signature after correction in an exemplary (1,1,5)-tap system;

FIG. 14 shows an exemplary schematic of the ESA module of FIG. 6;

FIG. 15 shows a flow diagram for an exemplary ESA tap adaptation algorithm of the ESA module of FIG. 6;

FIG. 16 shows a flow diagram for the pulse response recording sub-algorithm of the ESA tap adaptation algorithm of FIG. 15;

FIG. 17 shows a graphical representation of the pulse response criteria of the ESA tap adaptation sub-algorithm of FIG. 16; and FIG. 18 shows an exemplary plot of tap voltages versus adaptation time for blind tap adaptation in an exemplary (1,1,4)-tap system, in accordance with exemplary embodiments.

DESCRIPTION

Described embodiments provide an Error Signature Analysis (ESA) digital signal processing (DSP) receiver to recover data. Notable advantages include linear circuit and power scaling with respect to the number of pulse response taps, the ability to equalize pre-cursor inter-symbol interference (ISI), floating tap capability, and blind tap adaptation, making ESA well-suited for low-power, long-reach channels. As described herein, embodiments of ESA recover data symbols in three steps: (1) an initial, low quality estimation of each received data symbol (approximately 0.1 error probability, channel dependent); (2) the estimated symbols are combined with the pulse response tap coefficients to compute estimated analog-to-digital converter (ADC) values; and (3) an error signature is computed by taking the difference between the actual and estimated ADC values. When a symbol has been incorrectly estimated in the first step, it causes the error signature to deviate from its near-zero ideal value, triggering that symbol to be corrected and the error signature to be recomputed from the initial high-BER data symbol estimation stage.

Table 1 summarizes a list of acronyms employed throughout this specification as an aid to understanding the described embodiments of the invention:

TABLE 1

| SERDES | Serializer/Deserializer | IC | Integrated Circuit |
| FIR | Finite Impulse Response | AFE | Analog Front End |
| CDR | Clock and Data Recovery | DFE | Decision Feedback Equalizer |
| BER | Bit Error Rate | DAC | Digital to Analog Converter |
| ADC | Analog to Digital Converter | ISI | Intersymbol Interference |
| FFE | Feed Forward Equalizer | DBE | Digital Back End |
| UI | Unit Interval | RF | Radio Frequency |
| NRZ | Non-Return to Zero | ESA | Error Signature Analysis |
| PCIE | Peripheral Component Interconnect Express | PAM | Pulse Amplitude Modulation |

Figure 1:
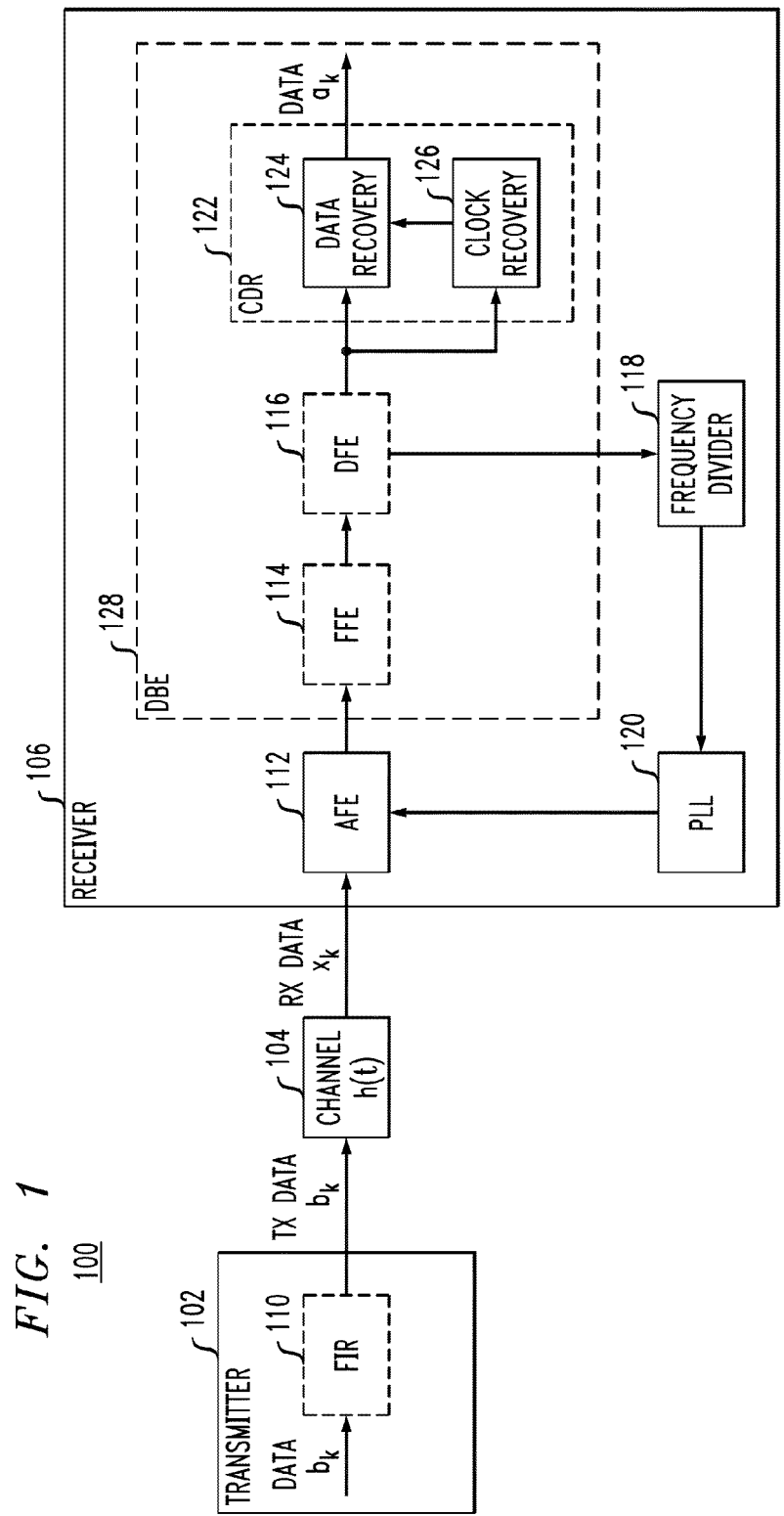
FIG. 1 shows an exemplary block diagram of a serializer-deserializer (SERDES) communication system.

FIG. 1 shows a block diagram of exemplary SERDES communication system 100. As shown in FIG. 1, SERDES system 100 includes transmitter 102, communication channel 104 and receiver 106. As shown, transmitter 102 might optionally include a finite impulse response filter for conditioning data before transmission to communication channel 104. Transmitter 102 provides a transmit signal as serial data bits, $b_k$, via communication channel 104, to receiver 106. Communication channel 104 might typically be a physical transmission medium, such as a backplane, drive head in a magnetic recording system, copper cables, or optical fibers. Although described herein as being employed in a serializer-deserializer (SERDES) communication system, embodiments of the present invention are not so limited, and some embodiments might be employed in alternative communications systems employing a transmitter and a receiver communicating over a communication channel. The communication channel might be at least one of fiber optics, one or more coaxial cables, one or more twisted pair copper wires, or one or more radio frequency (RF) channels. Additionally, various signal modulation and de-modulation techniques might be employed. Further, although described herein as each "bit" of a signal having a corresponding logic value, it is understood that the various signals described herein might employ multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal encoding scheme might be employed.

After passing though communication channel 104, the analog transmit signal might be filtered or equalized by analog front end (AFE) 112 of receiver 106. AFE 112 might comprise a continuous time analog filter. The output of AFE 112 might be provided to at least one of optional feed forward equalizer (FFE) 114 and optional decision feedback equalizer (DFE) 116. FFE 114 might optionally be employed to reduce precursor ISI. DFE 116 generates equalized output based on one or more previous data decisions and pulse response coefficients (taps) corresponding to communication channel 104. DFE 116 might provide a control signal to frequency divider 118 and PLL 120 to adjust the operation of AFE 112. DFE 116 also provides an equalized output signal to clock and data recovery (CDR) circuit 122 to sample the equalized signal.

As shown, CDR 122 includes data recovery module 124 and clock recovery module 126. Clock recovery module 126 adjusts the phase and frequency of the digital clock for sampling the received analog waveform to allow proper data detection. For example, the phase of the received analog waveform is typically unknown and there might be a frequency offset between the frequency at which the original data was transmitted and the receiver sampling clock frequency. Clock recovery module 126 provides sampling clock data to data recovery module 124. Data sampled by data recovery module 124 is provided as output data $a_k$, which might typically be provided to subsequent modules (not shown) of receiver 106 for further processing.

Figure 2:
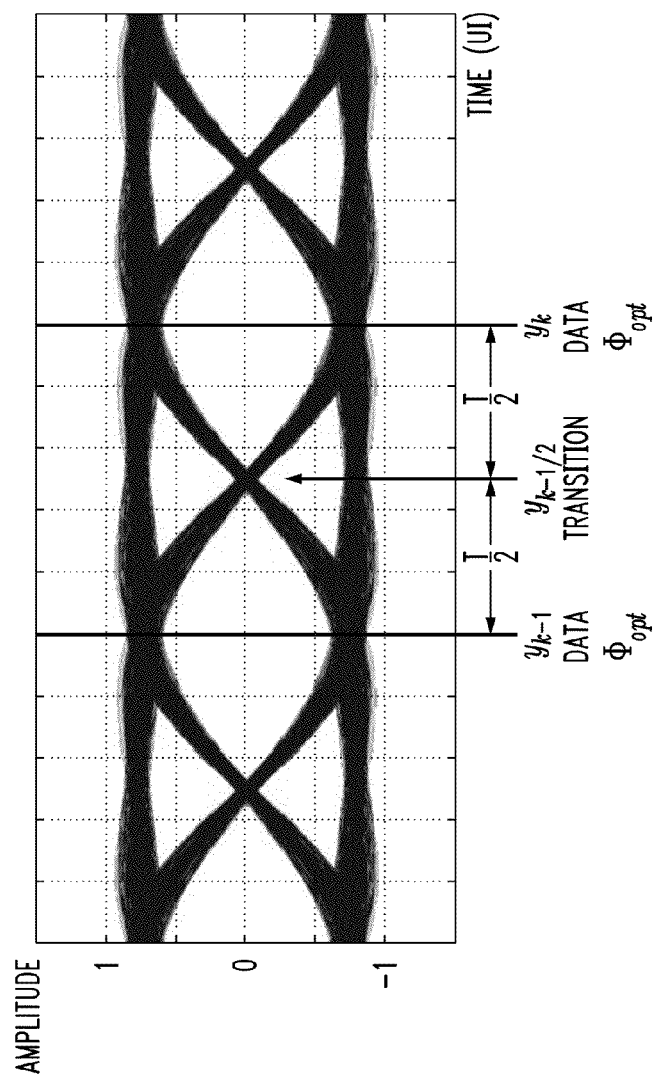
FIG. 2 shows an exemplary eye diagram of the receiver of the SERDES system of FIG. 1.

FIG. 2 shows a plot of exemplary data eye 200 of receiver 106. Data eye 200 illustrates super-positions of many data eyes of signal transitions expressed in amplitude versus time in UI. The data eye is created as received signals transition from low to low, low to high, high to low and high to high. Transitions from low to high and high to low might also be termed a transition or crossing point. CDR 122 detects timing of the received data stream and uses the detected timing to correct the frequency and phase of a local clock for sampling the received data. As shown in FIG. 2, for baud-rate CDR circuits, the received signal is sampled once every UI ($y_{k-1}$ and $y_k$). Alternatively, for over-clocked circuits, such as bang-bang CDR circuits, the received signal is sampled twice every UI, one sample at a crossing point ($y_{k-1/2}$) and another sample at the center of the data eye ($y_k$). Two consecutive data samples, ($y_{k-1}$ and $y_k$), and a crossing sample between them, ($y_{k-1/2}$), might then be used to decide whether the current sampling phase is lagging or leading the ideal sampling point.

Figure 3A:
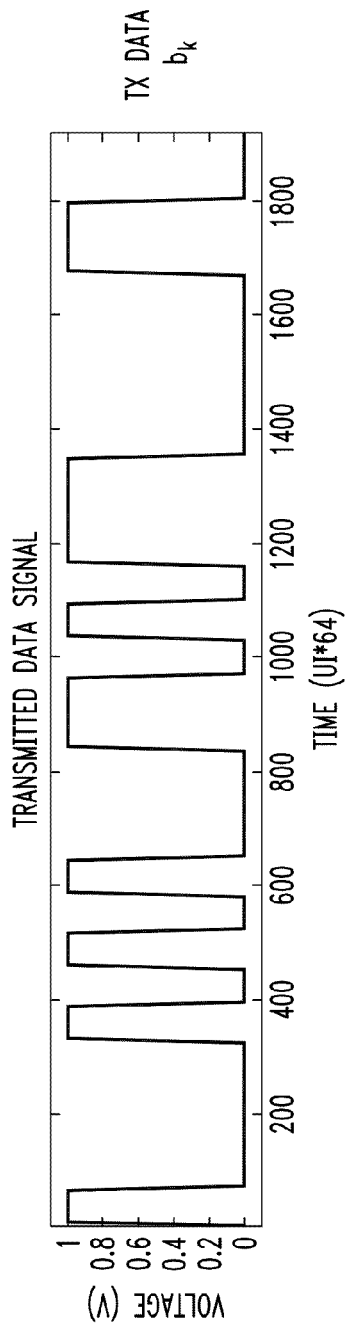
FIG. 3A shows an exemplary transmit data signal of the transmitter of the SERDES system of FIG. 1.
Figure 3B:
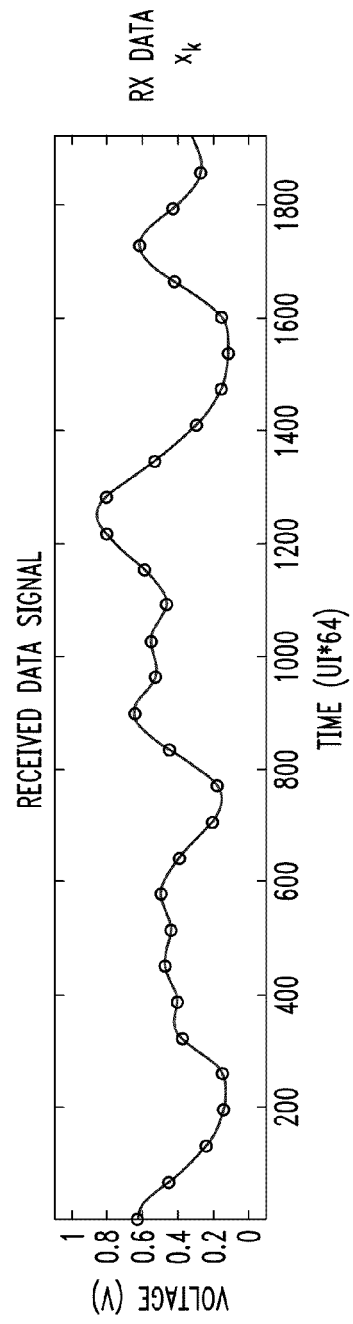
FIG. 3B shows an exemplary receive data signal of the receiver of the SERDES system of FIG. 1.

Due to the channel pulse response, h(t), of communication channel 104, the transmitted signal bits, $b_k$, are received by receiver 106 as receive data bits $x_k$. FIG. 3A shows a plot of exemplary transmitted data signal, $b_k$ 302, voltage versus time in unit intervals (UI), where a UI corresponds to a symbol period. FIG. 3B shows a plot of received data signal, $x_k$ 312, corresponding to transmitted signal $b_k$ 302 for an exemplary communication channel 104. As shown in FIGS. 3A and 3B, received data signal $x_k$ 312 might not be identical to transmitted data signal $b_k$ 302, for example due to intersymbol interference (ISI) based on the pulse response h(t) of communication channel 104.

Figure 5:
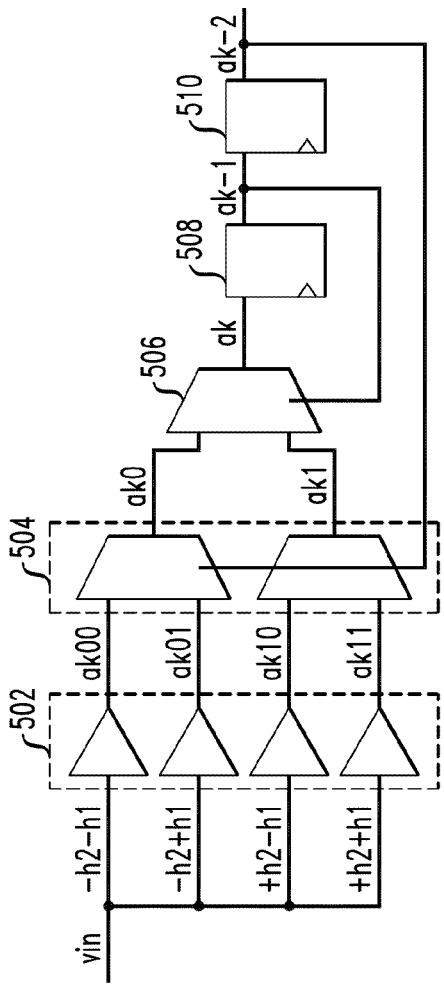
FIG. 5 shows an exemplary block diagram of a 2-tap fully unrolled decision feedback equalizer (DFE) of the SERDES system of FIG. 1.

FIG. 4 shows an exemplary plot 400 of the voltage over time of channel pulse response h(t) of communication channel 104 at receiver 106. Channel pulse response h(t) is the result of transmitting an approximately rectangular pulse (with finite rise and fall times and neglecting pre-emphasis) from transmitter 102. As shown in FIG. 4, each data pulse transmitted over communication channel 104 generates pulse response h(t) received at receiver 106, pulse response h(t) includes a pre-cursor ISI component (h−1) in the UI before the pulse, the cursor component ($h_0$) at the UI of the pulse, and one or more post-cursor ISI components ($h_1$, $h_2$, $h_3$) at UIs following the pulse. As multiple pulses are transmitted over communication channel 104 at high data rates (e.g., the exemplary transmitted data signal $b_k$ of FIG. 3A), the overlapping in time of received symbols leads to ISI between each pulse as ISI contributions from previous symbols can add or subtract from the voltage amplitude of the current symbol (e.g., the exemplary received data signal $x_k$ of FIG. 3B). DFE 116 subtracts the sum of the ISI contributions for a predetermined number of previously received symbols from the received signal by multiplying the previously received symbol values with their corresponding pulse response coefficients (taps) summing the products, and subtracting them from the received signal. FIG. 5 shows a block diagram of exemplary 2-tap fully unrolled DFE 500. As shown in FIG. 5, fully unrolled DFE 500 does not have a feedback path between the analog and digital domains and, thus, the 1 UI iteration bound is alleviated. DFE 500 precomputes the possible ISI contributions based on the received symbol history, and the pre-computed values are used as the voltage thresholds of the comparators in comparator array 502. Since DFE 500 is a 2-tap DFE, the possible symbol histories ($b_{-2}b_{-1}$) might be (00), (01), (10) and (11), corresponding to ISI contributions $-h_2-h_1$, $-h_2+h_1$, $+h_2-h_1$, and $+h_2+h_1$, respectively. Multiplexers 504 and 506 select the appropriate comparator 502 during a given UI. Latches 508 and 510 are used to store prior bits corresponding to each tap (e.g., $b_{-2}b_{-1}$). Although the AFE-DBE feedback path is eliminated by DFE 500, a 1 UI iteration bound still exists in the DBE. Although shown as a 2-tap DFE, any number of taps could be similarly implemented. For example, adding one more tap will double the number of possible symbol histories (e.g., 2 taps, $2^2=4$ to 3 taps $2^3=8$), thereby doubling the number of comparators and multiplexers of DFE 500. Thus, fully unrolled DFE 500, although advantageous for short- or medium-reach channels needing up to approximately 6-7 taps, is not well suited for long-reach or high-impairment channels due to this exponential scaling property. Described embodiments provide an Error Signature Analysis (ESA) digital signal processing (DSP) receiver to recover data. Notable advantages include linear circuit and power scaling with respect to the number of pulse response taps, the ability to equalize precursor ISI, floating tap capability, and blind tap adaptation, making ESA well-suited for low-power, long-reach channels. Like a DFE, ESA corrects for ISI in the received signal by utilizing the tap coefficients of the channel pulse response. However, a DFE makes one, high quality estimation of each received data symbol (low error probability) and equalizes the received signal (e.g., physically subtracting a voltage in an analog DFE, or setting comparator thresholds to be ISI-weighted values in a fully-unrolled DFE). As described herein, embodiments of ESA recover data symbols in three steps: (1) an initial, low quality estimation of each received data symbol (approximately 0.1 error probability, channel dependent); (2) the estimated symbols are combined with the pulse response tap coefficients to compute estimated ADC values; and (3) an error signature is computed by taking the difference between the actual and estimated ADC values. When a symbol has been incorrectly estimated in the first step, it causes the error signature to deviate from its near-zero ideal value, triggering that symbol to be corrected and the error signature to be recomputed from the initial high-BER data symbol estimation stage.

FIG. 6 shows an exemplary block diagram of an ESA receiver. As described in regard to FIG. 1, receiver 106 includes AFE 112. AFE 112 includes and analog-to-digital converter (ADC) that samples the received signal once per UI (e.g., baud rate sampling). The ADC can be of any multiple types of ADC's, for example a flash ADC or Successive Approximation Register (SAR). The resulting n-bit output of the ADC is provided to DBE 128. As shown in FIG. 6, DBE 128 of FIG. 1 might optionally include FFE 114. The n-bit output of AFE 112 (or optional FFE 114) is provided to ESA module 600.

As shown in FIG. 6, ESA module 600 might generally be shown to include three stages. A first stage is fast symbol estimation module 602, the second stage is ADC reconstruction module 604 and the third stage is error signature analyzer 606. Each of ESA stages 602-606 operates on a slow digital clock, $d_{clk}$, whose frequency is an integer fraction of the fast analog clock, $a_{clk}$: $d_{clk}=(1/W)a_{clk}$, where W is the number of bits/symbols processed in one digital clock period. Thus, each digital back-end stage processes a window of W symbols during one digital clock period, e.g., W=8 or W=16, etc. ESA module 600 might also include, or be in communication with, one or more counters 608 and accumulators 610.

As described herein, a[j] is an n-bit ADC output, and a'[j], a"[j], and so on are subsequent estimates of the ADC value a[j], where j indicates a given bit period. Similarly, b[j] is a transmitted bit (e.g., from transmitter 102) and b'[j], b"[j], and so on are subsequent estimates of the transmitted bit b[j]. Finally, e'[j], e"[j], and so on are m-bit error signature values. Thus, as indicated in FIG. 6, the n-bit signal is deserialized into n-bit estimated ADC values a[j] through a[j+W−1] that are provided to fast symbol estimation module 602. Deserialization might be performed by any standard deserializer. Fast symbol estimation module 602 receives the n-bit ADC values from AFE 112 (e.g., ADC values a[j] through a[j+W−1]), and generates estimated bits b'[j] through b'[j+W−1]. Fast symbol estimation module 602 provides the n-bit ADC values a[j] through a[j+W−1] and the estimated bits b'[j] through b'[j+W−1] to ADC reconstruction module 604. ADC reconstruction module 604 generates an estimated ADC value, a'[j], for each estimated bit, based on the channel pulse response, h(i). ADC reconstruction module 604 generates an estimated error value, e'[j] based on the difference between the a[j] and a'[j] for each bit in the W-bit window. ADC reconstruction module 604 provides the n-bit ADC values a[j] through a[j+W−1], the estimated ADC value a'[j] through a'[j+W−1] for each bit in the W-bit window, the estimated bits b'[j] through b'[j+W−1], and the error estimate e'[j] to error signature analyzer 606. Error signature analyzer 606 generates a corrected bit value, b"[j], and a corrected error signature value, e"[j], for each bit in the W-bit window. Corrected bits b"[j] through b"[j+W−1] might typically be provided to other modules of receiver 106 for processing as received data. The specific function of ESA module 600 will now be described.

Fast symbol estimation module 602 rapidly estimates the received data symbols, b'[j]. These estimations might produce a channel-dependent BER on the order of $10^{-1}$, as opposed to the typically expected BER of robust receivers, which is more on the order of $10^{-12}$ to $10^{-18}$. However, the intent of fast symbol estimation module 602 is not to provide the actual data, but rather to quickly provide bit estimates to the timing recovery circuit. Because of the averaging function of the timing recovery circuit (e.g., proportional and/or integral loops), a BER of $10^{-1}$ is sufficient to extract timing information and jitter tolerance. Thus, fast symbol estimation module 602 beneficially addresses the timing recovery loop latency limitation of standard DFE circuits.

Fast symbol estimation module 602 determines each bit estimate, b'[j], by computing a voltage difference, $\Delta v[j]$, between the current and previous ADC values, a[j] and a[j−1], respectively, as shown by Equation (1):

$$\Delta v[j]=a[j]-a[j-1] \quad (1)$$

If $\Delta v[j]$ is large and negative, then the b[j−1] to b[j] transition is likely a transition from a "1" to a "0". Thus, b'[j] is estimated to be a 0. Similarly, if $\Delta v[j]$ is large and positive, then the b[j−1] to b[j] transition is likely a transition from a "0" to a "1", thus, b'[j] is estimated to be 1. Finally, if $\Delta v[j]$ is small and either negative or positive, then b[j−1] and b[j] are likely the same value (e.g., a "transition" of 1 to 1 or 0 to 0), and b'[j] is estimated to be equal to b'[j−1]. The decision of whether $\Delta v[j]$ is "large" or "small" is determined by comparison to a threshold voltage, $\Delta v_{th}$. Table 2, below, shows a truth table function of fast symbol estimation module 602:

TABLE 2

| $\Delta v[j]$ | b'[j] |
|---|---|
| $<-\Delta v_{th}$ | 0 |
| $>+\Delta v_{th}$ | 1 |
| $\geq -\Delta v_{th}$ and $\leq +\Delta v_{th}$ | b'[j − 1] |

As described herein, in described embodiments $\Delta v_{th}$ might be determined analytically, by bitwise simulation, or statistically. For example, if the channel pulse response has been determined, then an analytical or simulation-based determination can be made. If the pulse response is not known, then bit-transition data statistics might be collected from within receiver 106 (e.g., by counters) to determine $\Delta v_{th}$. As described herein, the determination of $\Delta v_{th}$ might be by bitwise simulation of random, non-encoded data transmitted through communication channel 104. The received signal is sampled at 1-UI intervals with n-bit resolution over the dynamic range. Note that this approach is algorithmically identical to the data statistics collection method, and yields accurate results provided that the simulated ADC resolution and impairments accurately match those of an actual receiver front-end ADC.

FIGS. 7A-D show probability distribution functions (PDFs) of $\Delta v[j]$ for the four possible received 2-bit sequences, b[j−1] to b[j]. Specifically, FIG. 7A shows a PDF for bit sequence [00], FIG. 7B shows a PDF for bit sequence [10], FIG. 7C shows a PDF for bit sequence [11], and FIG. 7D shows a PDF for bit sequence [01]. According to Table 2, the green regions indicated in FIGS. 7A-D correspond to the probability of b'[j] being correctly estimated, the red regions correspond to the probability of b'[j] being incorrectly estimated, and the black regions correspond to the probability of b'[j] falling between $-\Delta v_{th}$ and $+\Delta v_{th}$, where the value of b'[j] is conditional on the previous bit estimate, b'[j−1]. $\Delta v_{th}$ is determined by maximizing the probability of correct bit estimation (green region plus black region multiplied by the probability that b'[j−1]=b[j]) for each of the 2-bit sequences. The conditional probability yields an infinite recursive sum of conditional probabilities on b'[j−2], b'[j−3], and so on, as indicated by Equations (2a-2d):

$$\Delta v_{0\to 0}: pr\{b'[j]=b[j]=0\}=\int_{-\infty}^{-\Delta v_{th}} pdf(\Delta v_{0\to 0})+ \int_{-\Delta v_{th}}^{+\Delta v_{th}} pdf(\Delta v_{0\to 0}) \times pr\{b'[j-1]=0\} \quad (2a)$$

$$\Delta v_{1\to 0}: pr\{b'[j]=b[j]=0\}=\int_{-\infty}^{-\Delta v_{th}} pdf(\Delta v_{1\to 0})+ \int_{-\Delta v_{th}}^{+\Delta v_{th}} pdf(\Delta v_{1\to 0}) \times pr\{b'[j-1]=1\} \quad (2b)$$

$$\Delta v_{1\to 1}: pr\{b'[j]=b[j]=1\}=\int_{\Delta v_{th}}^{\infty} pdf(\Delta v_{1\to 1})+ \int_{-\Delta v_{th}}^{+\Delta v_{th}} pdf(\Delta v_{1\to 1}) \times pr\{b'[j-1]=1\} \quad (2c)$$

$$\Delta v_{0\to 1}: pr\{b'[j]=b[j]=1\}=\int_{\Delta v_{th}}^{\infty} pdf(\Delta v_{0\to 1})+ \int_{-\Delta v_{th}}^{+\Delta v_{th}} pdf(\Delta v_{0\to 1}) \times pr\{b'[j-1]=0\} \quad (2d)$$

However, for simplicity, the conditional probability determination might be truncated at any value. As shown in FIGS. 7A-D, the conditional probability is truncated at b'[j−1]. The resulting determination of $\Delta v_{th}=67.4$ mV is shown in FIGS. 7A-D as dotted black lines. The pulse response values for +/−$h_{-1}$ are shown in FIGS. 7A-D as purple lines, and the pulse response values for +/−$h_0$ are shown in FIGS. 7A-D as blue lines. FIG. 8 shows an exemplary received bit sequence with corresponding PDFs overlaid the received bit sequence.

ADC reconstruction module 604 might generally approximate each n-bit ADC value as a sum of pre-cursor ISI, cursor voltage, post-cursor ISI, and noise, offset, quantization, etc. as shown in Equation 3:

$$a[j]=\Sigma_{-\infty}^{\infty} b[-i+j] \times h_i + \text{noise}+\text{offset}+\text{quantization}+\ldots \quad (3)$$

Given a pulse response, $h_i$, the number of pre-cursor and post-cursor taps is selected to sufficiently equalize both pre-cursor and post-cursor ISI. For simplicity and without loss of generality, an embodiment having one pre-cursor tap, $h_{-1}$, and three post-cursor taps, $h_1$, $h_2$, and $h_3$, is described herein, although any number of pre-cursor and post-cursor taps might be employed. The shorthand notation (number pre-cursor taps, number cursor taps, number post-cursor taps) is used herein, thus, the exemplary system described herein is identified as a (1,1,3)-tap system.

Employing only a finite number of taps from the theoretically infinite pulse response results in residual (e.g., unequalized) ISI. This residual ISI may be grouped together with the other impairments from Equation 3 as a constant, C, yielding ADC values given by Equation 4:

$$a[j] = \sum_{taps} b[-i+j] \times h_i + \text{noise}+\text{offset}+\text{quantization}+ \quad (4)$$
$$\text{residual\_ISI}$$
$$= \sum_{taps} b[-i+j] \times h_i + C$$
$$= \sum_{i=-1}^{i=3} b[-i+j] \times h_i + C$$

(Equation 4 for a (1, 1, 3)-tap system)

ADC reconstruction module 604 estimates these actual ADC values, a[j], by reconstructing estimated ADC values, a'[j], using estimated bits, . . . b'[j−2], b'[j−1], b'[j], b'[j+1], b'[j+2], . . . determined by fast symbol estimation module 602. In the exemplary (1,1,3)-tap system having one pre-cursor tap, $h_{-1}$, and three post-cursor taps, $h_1$, $h_2$, and $h_3$, estimated ADC values, a'[j], are computed as shown in Equation 5:

$$a'[j]=\Sigma_{taps} b'[-i+j] \times h_i = \Sigma_{i=-1}^{3} b'[-i+j] \times h_i \quad (5)$$

Note that the computation of Equation 5 is a summation that scales linearly as additional taps are added, as opposed to the exponential scaling of fully unrolled DFEs. Furthermore, the ADC reconstruction computation might be pipelined to meet timing constraints (e.g., latches 1402, 1408, 1412, and 1416 of FIG. 14).

After each estimated ADC value, a'[j] is determined, each estimated value is used to calculate a corresponding error signature value, e'[j] (the sequence of error signature values is the error signature). Each error signature value, e'[j], is the absolute value difference between the estimated and actual ADC values, as given in Equation 6:

$$e'[j]=|a[j]-a'[j]| \quad (6)$$

Considering the exemplary (1,1,3)-tap system, assume that within the 5-UI window from $h_{-1}$ to $h_3$, the cursor bit b'[j], corresponding to $h_0$, was incorrectly estimated. Thus, using the relationships given in Equations 4, 5 and 6, computation of the error signature value yields Equation 7:

$$e'[j] = |a[j] - a'[j]| \quad (7)$$
$$= \left| \sum_{i=-1}^{3} b[-i+j] \times h_i + C - \sum_{i=-1}^{3} b'[-i+j] \times h_i \right|$$
$$= \left| \begin{array}{l} h_{-1} b[j+1] + h_0 b[j] + h_1 b[j-1] + h_2 b[j-2] + \\ h_3 b[j-3] - h_{-1} b'[j+1] - h_0 b'[j] - h_1 b'[j+1] - \\ h_2 b'[j-2] - h_3 b'[j-3] + C \end{array} \right|$$
$$= |h_0 b[j] - h_0 b'[j] + C|$$
$$= |\pm h_0 - \mp h_0| + C$$
$$= 2h_0 + C$$
$$\approx 2h_0$$

Equation 7 shows that when the cursor bit estimate, b'[j], is in error, its error signature value is approximately twice the pulse response coefficient cursor value, $2h_0$, since C is small with respect to $h_0$. In fact, for any single bit estimation error, b'[j±k], the corresponding error signature value is twice the corresponding pulse response coefficient value. Thus, in the exemplary (1,1,3)-tap system described herein, an erroneous cursor bit, b'[j], yields error signature values {e'[j+1] e'[j] e'[j−1] e'[j−2] e'[j−3]}=2{$h_{-1}$ $h_0$ $h_1$ $h_2$ $h_3$}. If cursor bit, b'[j], is correctly estimated, then the error signature is {C[j+1] C[j] C[j−1] C[j−2] C[j−3]}≈{0 0 0 0 0}. In other words, the error signature is approximately zero when no estimated bits are in error, and displays a scaled-by-2 pulse response when a single estimated bit is in error.

When additional estimated bits are in error within the range of considered taps (e.g., burst errors), the error signature displays a superposition of pulse responses centered on the erroneous estimated cursor bits. FIG. 9A shows the error signature resulting from a random sequence of bits for the exemplary (1,1,3)-tap system, with erroneous bit estimations shown as red dots 1302(1)-1302(12). FIG. 9B shows the same exemplary error signature with the scaled pulse responses shown in FIG. 4 for each bit superimposed in red. Given the scaled pulse response properties of the error signature just described, erroneous estimated bits can be detected and corrected. Each error signature value, e'[j] is compared to an error threshold voltage, $vth_{error}$. Whenever the error signature value, e'[j], is greater than $vth_{error}$, the estimated bit, b'[j], is assumed to be in error and is corrected. Table 3 shows an exemplary truth table employed by error signature analyzer 606 to determine the second bit estimates, b"[j] (e.g., to perform bit correction).

TABLE 3

| e'[j] | 1st bit estimate b'[j] | 2nd bit estimate b"[j] |
|---|---|---|
| ≤$vth_{error}$ | 0 | 0 |
|  | 1 | 1 |
| >$vth_{error}$ | 0 | 1 |
|  | 1 | 0 |

Analysis of the error signature for bit estimation errors can occur from left to right (e.g., from past to future as shown in FIGS. 9A-B), or from right to left (e.g., from future to past as shown in FIGS. 9A-B). Although the choice might seem arbitrary, left-to-right (e.g., past to future) analysis performs better in detecting bit estimation errors because of the magnitude difference between $h_{-1}$ and $h_0$ as it relates to the threshold voltage, $vth_{error}$, as will be described below. Selecting the appropriate value for the threshold voltage, $vth_{error}$, is necessary to detect and correct bit estimation errors. If $vth_{error}$ is too large, erroneous bit estimations will not be detected and will not be corrected, and if $vth_{error}$ is too small, non-erroneous bit estimations will be falsely "corrected." An appropriate value is one that triggers corrections only on erroneous bit estimates that correspond to the cursor position of the pulse response ($h_0$). Thus, $vth_{error}$ should be larger than e'[j±k], k≠0 (e.g., for non-cursor positions) and smaller than e'[j] (cursor position). For most channels, the difference between $h_{-1}$ and $h_0$ is much larger than the difference between $h_1$ and $h_0$. Therefore, it makes sense to inspect error signature values from left to right (e.g., past to future), inspecting the pre-cursor error signature value, $2h_{-1}$, prior to the cursor error signature value, $2h_0$. Thus, the error threshold voltage, $vth_{error}$, might ideally be selected as the midpoint between $2h_{-1}$ and $2h_0$, which is given in Equation 8 and shown graphically as $vth_{error}/2$ in FIG. 10.

$$vth_{error} = \frac{(2h_{-1} + 2h_0)}{2} = h_{-1} + h_0 \quad (8)$$

After correcting each erroneous bit estimate according to Table 3 (e.g., generating b"[j]), error signature analyzer 606 also reconstructs the corresponding ADC estimate, a"[j], and recalculates the error signature values, e"[j], as given in Equation 9 and Equation 10, respectively:

$$a"[j] = \Sigma_{taps} b"[-1+j] \times h[i] \quad (9)$$

$$e"[j] = |a[j] - a"[j]| \quad (10)$$

FIG. 11A shows the error signature values of the exemplary random bit sequence from FIG. 9A before the bit correction step (e'[j]), where the horizontal red line is the threshold voltage, $vth_{error}$. FIG. 11B shows the error signature values of the exemplary random bit sequence after the bit correction step (e"[j]). As shown in FIG. 11B, after one iteration of bit correction, no bits had a corresponding error signature value greater than the error threshold, $vth_{error}$. In some embodiments, recomputing the error signature involves reconstructing all affected ADC values, {a"[j−1], a"[j], a"[j+1], . . . a"[j+z]} in an (x,y,z)-tap system, as given in Equation 9, and then recomputing all affected error signature values, {e"[j−1], e"[j], e"[j+1], . . . e"[j+z]}, as given in Equation 10. FIGS. 12A-C show a time progression of these operations in an exemplary W=16, (1,1,3)-tap system given two bit errors. FIG. 12A shows the exemplary time progression up to bit 6, FIG. 12B shows the exemplary time progression up to bit 9, and FIG. 12C shows the exemplary time progression up to bit 16. Note that this strategy recomputes precursor values (e"[j−1] and a"[j−1]), making it suitable for multiple bit correction iterations to be employed.

Despite being shown in this exemplary case as only employing one iteration of bit correction (e.g., one error signature analyzer 606), multiple bit correction iterations could alternatively be employed (e.g., multiple error signature analyzers 606 in series). For example, if the number of taps employed is insufficient for a particular channel, then the reconstructed ADC values might not accurately estimate the actual ADC values, resulting in missed bit estimation errors when analyzing the error signature. Thus, it might be desirable to cascade multiple error signature analyzers 606, each time potentially improving the overall system BER.

Cascading multiple error signature analyzers 606 increases the total data recovery system latency. More importantly, however, cascading multiple error signature analyzers 606 might not always reduce the BER. For example, employing too few taps for a particular channel might cause erroneous "correction" of already correctly estimated bits. Table 4 shows BER results for 106 bits transmitted over an HP24 PCIe3 channel at 8 Gbps employing different numbers of error signature analyzer 606 stages.

TABLE 4

| Number of error signature iterations | Taps | | |
|---|---|---|---|
|  | (1, 1, 3) | (1, 1, 4) | (1, 1, 5) |
| 0 | 0.0978 | 0.0978 | 0.0978 |
| 1 | 0.0008 | 0.0001 | 0 |
| 2 | 0.0002 | 0 | 0 |
| 3 | 0.0004 | 0 | 0 |
| 4 | 0.0002 | 0 | 0 |
|  | BER | | |

Inspecting down the (1,1,3) column, it can be seen that after two iterations the BER is 0.0002, but after three iterations, the BER increases to 0.0004. In contrast, inspecting across the rows of Table 4 reveals that as the number of post-cursor taps increases from 3 to 4 to 5, the BER improves monotonically and rapidly. Since the ESA architecture scales linearly with taps, as described herein, increasing the number of taps is a preferable option to improve BER. FIGS. 13A-D shows the error signature of exemplary (x,y,z)-tap systems: FIG. 13A shows the error signature before bit correction. FIG. 13B shows the error signature after correction in an exemplary (1,1,3)-tap system, FIG. 13C shows the error signature after correction in an exemplary (1,1,4)-tap system, and FIG. 13D shows the error signature after correction in an exemplary (1,1,5)-tap system. Each (x,y,z)-tap system shown in FIGS. 13A-D employs one bit correction iteration (e.g., one stage of error signature analyzer 606). As shown in FIGS. 13A-D, as the number of taps increases, the error signature after a single iteration of bit correction, e"[j], approaches zero (e.g., there is less residual ISI).

The preceding description of ESA module 600 described generally an (x,y,z)-tap system in which all taps were adjacent to the cursor tap. However, in some embodiments, it might be desired to equalize ISI due to channel reflections that occur beyond this range. Since data recovery is done entirely in DBE 128, implementing floating taps might be accomplished by employing a first-in, first-out (FIFO) variable length register (e.g., a serial flip-flop chain) to delay and sequence past bits.

FIG. 14 shows an exemplary schematic of ESA module 600. As shown in FIG. 14, the hardware operations of ESA module 600 generally comprise basic n-bit additions and subtractions. As shown in FIG. 14, the first stage of ESA module 600, fast symbol estimation module 602, receives the n-bit quantized ADC values for a W-bit window of received data. Fast symbol estimation module 602 includes latch 1402 to pipeline the data. Comparators 1404(0)-1404(W-1) compute voltage differences, $\Delta v[j]$, for each pair of n-bit ADC words, a[j] and a[j-1], as n-bit subtractions in parallel. Comparators 1406(0)-1406(W-1) estimate each bit, b'[j] by comparing $\Delta v[j]$ to $\Delta vth$, which is also an n-bit subtraction. In the worst case, $-\Delta vth < \Delta v[j] < +\Delta vth$ for all j, which, if each n-bit operation has propagation delay P, results in a worst-case latency of P+(W*P). The estimated bits, b'[0] through b'[W-1] are provided to timing recovery block 126. Latch 1408 is employed to pipeline data between fast symbol estimation module 602 and ADC reconstruction module 604.

As shown in FIG. 14, the second stage of ESA module 600 is ADC reconstruction module 604. ADC reconstruction module 604 computes W ADC estimates, a'[j] is ADC estimation blocks 1410(0)-1410(W-1). For an (x,y,z)-tap system there are (W)(x+y+z) operations, yielding a latency of approximately $(W)(\log_2(x+y+z))(P)$. FIG. 14 shows an exemplary (1,1,3)-tap system, thus, each ADC estimation block 1410(0)-1410(W-1) receives 3 post-cursor bits (shown in blue, e.g., b[1], b[2], b[3]), the cursor bit (shown in green, e.g., b[0]), and a pre-cursor bit (shown in red, e.g., b[-1]). Based on the received bit estimates, b'[j], an n-bit estimated ADC value, a'[j] is generated by blocks 1410. Latch 1412 is employed to both (i) pipeline data between ADC reconstruction module 604 and error signature analyzer 606 and (ii) wait for the pre-cursor bit to arrive for ADC estimation block 1410(W-1).

As shown in FIG. 14, the third stage of ESA module 600 is error signature analyzer 606. As shown in FIG. 14, error signature estimators (e') 1414(0)-1414(W-1) receive the estimated ADC value (a'[j]) and actual ADC value (a[j]), and calculate a corresponding error signature value, e'[j], which is the absolute value difference between the estimated ADC value (a'[j]) and actual ADC value (a[j]), as given in Equation 6. The error signature values, e'[j], are provided to tap adaptation (not shown) of receiver 106. Latch 1416 pipelines the error signature values.

As described in regard to FIG. 13, each error signature value, e'[j] is compared to an error threshold voltage, $vth_{error}$ by error threshold comparators 1420(0)-1420(W-1). Whenever the error signature value, e'[j], is greater than $vth_{error}$, the estimated bit, b'[j], is assumed to be in error and is corrected to b"[j]. As described herein, cursor and post-cursor ISI contributions from an erroneous e'[j] are subtracted, such that e"[j+k]=e'[j+k]-2$h_k$, for all affected post-cursor values {e"[j], e"[j+1], . . . e"[j+z]} in an (x,y,z)-tap system. Although not shown in FIG. 14, additional latches might be employed to pipeline data, since due to the number of sequential operations, this stage might beneficially employ pipelining to meet timing requirements. Including the comparisons of e'[j] to $vth_{error}$, the number of operations is (W)+(W)(y+z), which are shown as error threshold comparators 1420(0)-1420(W-1) and error signature re-estimators (e") 1418, 1422, 1424, et seq., yielding a latency of (P)[(W)+(W)]=2(P)(W) since the (y+z) computations are performed in parallel. The corrected bits, b"[j] are provided to receiver 106 as received data.

As described herein, each erroneous estimated bit causes a scaled-by-2 pulse response (e.g., 2h[j-x] to 2h[j+z]) to appear within the error signature. For example, if an erroneous bit is in the pre-cursor position, it contributes $2h_{-1}$, if the erroneous bit is in the cursor position, it contributes $2h_0$, if the erroneous bit is in the first post-cursor position, $2h_1$, and so on. The net result is a scaled-by-2 pulse response: a 1-UI sampled version of h(t). Consequently, in some embodiments, determining and adapting the channel pulse response coefficients (taps) might be performed by observing the error signature. For example, as shown in FIG. 14, the error signature values, e'[j] output from error signature detectors 1414(0)-1414(W-1) are provided to a tap adaptation module (not shown) over a given time period.

If initially all tap values are zero, as shown in FIG. 18, then the error pulse is not really twice the actual pulse response, rather twice the believed pulse response. The adaptation algorithm then adjusts its tap values to better represent the actual pulse response by only selecting error pulses that meet a particular criteria based on a computed threshold voltage, $vth_{error}$. Selecting an error pulse means that the error pulse will be used to compute updated tap values. As described herein, tap values are extracted from the error pulse as half the magnitude at the respective 1-UI spaced locations and averaged with the old tap value to compute the new channel pulse response tap value. As shown in FIG. 18, this process computes and converges on the actual channel pulse response tap values, and continues running as long as the system is running As will be shown in FIGS. 15 and 16, lone error pulses are isolated from within the error signature as those that may be selected for tap adaptation purposes. Since system 100 might be considered a linear, time-invariant system, error pulses might overlap, for example if there are two adjacent bit errors. Overlapping error pulses causes a superposition of the two error pulses (shifted by 1 UI). As shown in FIG. 17, the tap adaptation algorithm observes the error signature over a number of UIs before the selected error pulse (future) and after the selected error pulse (past), corresponding to the number of post-cursor and pre-cursor taps, to ensure that over a given window of UIs, no other error pulse is present in the error signature. Further, residual ISI is considered in computing the tap values, since this residual ISI is present as essentially white noise in the error signature (essentially a DC offset). As will be described, residual ISI is accumulated and averaged for UIs that are not part of a selected error pulse. Thus, although residual ISI an infinite sum, only a finite number of pulse response taps are adapted (e.g., one or two pre-cursor taps and 5-10 post-cursor taps) for data recovery purposes.

FIG. 15 shows an exemplary flow diagram of ESA tap adaptation algorithm 1500.

As described herein, for an exemplary (x,y,z)-tap system, ESA module 600 might record the error values, e'[j−x] to e'[j+z], for non-overlapping (lone) scaled pulse responses (those that have no non-residual ISI contributions from other scaled pulse responses) and whose cursor position corresponds to e'[j]. At step 1502, ESA tap adaptation starts, for example at a startup time of receiver 106. At step 1504, the value of $Vth_{error}$ is initialized to a predetermined default value. At step 1506, one or more error counters of ESA module 600 (e.g., counters 608) are reset to default values (e.g., 0). At step 1508, ESA module 600 records at least one of the pulse response value and a residual ISI value of a corresponding received bit in a W-bit window of received data. Step 1508 is shown in greater detail in FIG. 16. At step 1510, if the last bit error in the W-bit window has been recorded at step 1510, process 1500 returns to step 1506 where counters 608 are reset, and a next W-bit window of received data is analyzed at step 1508. If, at step 1510, the last bit error in the W-bit window has not been recorded at step 1508, then, at step 1512, ESA module 600 proceeds to the next bit error for recording at step 1508.

FIG. 16 shows greater detail of step 1508 of FIG. 15. At step 1602, recording step 1508 is started. At step 1604, the taps (e.g., taps, x, y and z) are initialized to predetermined initial values, and at step 1606, the one or more tap accumulators and the residual ISI (RISI) accumulator (e.g., accumulators 610) are initialized to predetermined values (e.g., 0). As will be described, the tap accumulators sum each corresponding e'[j±k] value over a specified number of bits (e.g., the W-bit window). At step 1608, ESA module 600 determines whether the current error value, e'[j], is greater than the error threshold voltage, $vth_{error}$. If, at step 1608, e'[j] not greater than $vth_{error}$, then at step 1628, ESA module 600 does not record the corresponding e'[j] value.

If, at step 1608, e'[j] is greater than $vth_{error}$, then at step 1610, ESA module 600 determines whether the current bit is the cursor bit by determining whether the pre-cursor error value, e'[j−1], is greater than $vth_{error}$. As described herein, for example with regard to FIGS. 9A-B, the margin between the pre-cursor and the cursor might be much greater than the margin between the post-cursor and the cursor. For example, as shown in FIG. 17, no e'[j±(x+z)] value can be near or greater than a specified voltage about e'[j] (shown as "cursor voltage margin"), and e'[j−1] must be less than the current $vth_{error}$ value. In some embodiments, the cursor voltage margin value might be selected to be approximately 100 mV. Thus, at step 1608, if the value of e'[j] is greater than the error threshold $vth_{error}$, and, at step 1610, if the value of e'[j−1] is also greater than the error threshold $vth_{error}$, then the current bit is not the cursor position, and, at step 1628, ESA module 600 does not record the corresponding e'[j] value.

If, at step 1610, the value of e'[j−1] is greater than the error threshold $vth_{error}$, then the current bit is the cursor position, and at step 1612, ESA module 600 determines whether the current bit represents a lone pulse, for example as shown in FIG. 17. To determine a lone pulse, ESA module 600 might check the error values of a bit a certain number of bits ahead, and a bit a certain number of bits behind the cursor bit (e.g., the "cursor bit margin"). For example, to determine whether the current bit is a lone pulse, at step 1612, ESA module 600 might check whether e'[j±cursor bit margin] is greater than e'[j]−$vth_{error}$. If, for example, e'[j±cursor bit margin] is not greater than $vth_{error}$, then the current bit does not represent a lone pulse and, at step 1628, ESA module 600 does record the corresponding e'[j] value. If e'[j±cursor bit margin] is greater than $vth_{error}$, then the current bit does represent a lone pulse and, at step 1614, ESA module 600 accumulates the corresponding e'[j] value to an error accumulator (e.g., one of accumulators 610). At step 1616, a snapshot counter is incremented corresponding to the error snapshot (e.g., the value of e'[j]) being accumulated at step 1614, thus, counting the number of scaled pulse response recordings. After step 1616, process 1508 proceeds to step 1618.

After step 1628, at step 1630, ESA module 600 determines whether e'[j] is less than the minimum pulse response value, where the minimum pulse response value corresponds to the last tap in the system (e.g., $h_3$ in a (1,1,3)-tap system, $h_4$ in a (1,1,4)-tap system, and so on). If, at step 1630, e'[j] is less than the minimum pulse response value, then the value of e'[j] corresponds to residual ISI (RISI), and, at step 1632, the value of e'[j] is accumulated to an RISI accumulator (e.g., one of accumulators 610). At step 1634, an RISI counter (e.g., one of counters 608) is incremented corresponding to the accumulation of an RISI value at step 1632. Process 1508 then proceeds to step 1618. If, at step 1630, e'[j] is not less than the minimum pulse response value, then the value of e'[j] does not correspond to residual ISI (RISI), and process 1508 proceeds to step 1618.

At step 1618, ESA module 600 checks whether the RISI counter is greater than 0 (or some other predetermined threshold). If the RISI counter value is greater than 0, one or more error signature values have been accumulated (e.g., at step 1632). Thus, if, at step 1618, the RISI counter is greater than 0, at step 1620, ESA module 600 computes an average RISI value and determines updated tap values, for example by incrementing or decrementing one or more of the tap values by a step value. The average RISI might be based on the accumulated RISI value and the RISI counter value. The average RISI value might typically be subtracted from the calculated tap values to equalize the residual ISI. Process 1508 then proceeds to step 1622. If, at step 1618, the RISI counter is not greater than 0 (or the predetermined threshold), process 1508 proceeds to step 1622.

At step 1622, ESA module 600 checks whether the snapshot counter is greater than 0 (or some other predetermined threshold). If the snapshot counter value is greater than 0, one or more error signature values have been accumulated (e.g., at step 1614). Thus, if, at step 1622, the snapshot counter is greater than 0, at step 1624, ESA module 600 computes an updated $vth_{error}$ value, where the target $vth_{error}=h_0+h_{-1}$. Process 1508 then completes at step 1626. If, at step 1622, the snapshot counter is not greater than 0 (or the predetermined threshold), and process 1508 completes at step 1626.

FIG. 18 shows the resulting tap adaptation results for a (1,1,4)-tap system with blind tap adaptation (e.g., each tap is initialized to 0). As shown in FIG. 18, with blind tap adaptation, the tap values are adapted to relatively stable steady-state values within approximately 55 500-bit windows. In some embodiments, tap adaptation at step 1620 might be performed by incrementing the tap values from zero by a fixed incremental amount, such as shown in FIG. 18. In other embodiments, tap adaptation at step 1620 might be performed in fewer bit windows by employing gear shifting (e.g., course increments and fine increments of the tap values) or other optimization (e.g., initializing each tap to an expected target value rather than blind tap adaptation, etc.). Additionally, at step 1504, any reasonable initial $vth_{error}$ value might be chosen (e.g. 0), which is subsequently incremented or decremented by a specified voltage step (or gear shifted steps) at step 1624 based on the current cursor and pre-cursor tap values.

As described herein, described embodiments provide an Error Signature Analysis (ESA) digital signal processing (DSP) receiver to recover data. Notable advantages include linear circuit and power scaling with respect to the number of pulse response taps, the ability to equalize precursor ISI, floating tap capability, and blind tap adaptation, making ESA well-suited for low-power, long-reach channels. As described herein, embodiments of ESA recover data symbols in three steps: (1) an initial, low quality estimation of each received data symbol (approximately 0.1 error probability, channel dependent); (2) the estimated symbols are combined with the pulse response tap coefficients to compute estimated ADC values; and (3) an error signature is computed by taking the difference between the actual and estimated ADC values. When a symbol has been incorrectly estimated in the first step, it causes the error signature to deviate from its near-zero ideal value, triggering that symbol to be corrected and the error signature to be recomputed from the initial high-BER data symbol estimation stage.

While the exemplary embodiments of the invention have been described with respect to processes of circuits, including possible implementation as a single integrated circuit, a multi-chip module, a single card, or a multi-card circuit pack, the invention is not so limited. As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing some embodiments of the invention. When implemented on a general-purpose processor, the program code segments combine with the processor to provide a unique device that operates analogously to specific logic circuits. The invention can also be embodied in the form of a bitstream or other sequence of signal values electrically or optically transmitted through a medium, stored magnetic-field variations in a magnetic recording medium, etc., generated using a method and/or an apparatus of the invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of embodiments of this invention might be made by those skilled in the art without departing from the scope of the invention as expressed in the following claims.

We claim:

1. A method of recovering timing and data information from a signal received by a receiver of a communication system via a communication channel, the method comprising:

generating, by an analog-to-digital converter (ADC) of the receiver, the ADC operating at a baud rate of the communication channel, W actual ADC values, each actual ADC value corresponding to a bit sample of a window of W bit samples of the received signal, wherein W is a positive integer;

estimating, based on the W actual ADC values, an estimated bit value corresponding to each bit sample of the W bit samples, by a fast symbol estimation module of the receiver operating at a digital clock rate of the receiver;

providing the W estimated bit values to a timing recovery module of the receiver;

estimating, by an ADC reconstruction module of the receiver, a reconstructed ADC value corresponding to each bit sample of the W bit samples, the reconstructed ADC value based on the corresponding estimated bit value and (i) a first predetermined number of pre-cursor pulse response taps of the receiver, (ii) a cursor pulse response tap of the receiver, and (iii) a second predetermined number of post-cursor pulse response taps of the receiver; and generating a corrected bit value for each bit sample of the W bit samples based on (i) the corresponding reconstructed ADC value, (ii) the corresponding estimated bit value, and (iii) the corresponding actual ADC value.

2. The method of claim 1, wherein the digital clock rate is substantially equivalent to the baud rate divided by W.

3. The method of claim 1, wherein the step of estimating, by the fast symbol estimation module of the receiver, the estimated bit value corresponding to each bit sample of the W bit samples comprises:

determining for each bit sample a first voltage difference for each pair of actual ADC values of the W actual ADC values, each pair comprising a current ADC value and a previous ADC value;

determining for each bit sample a second difference between the determined first voltage difference and a threshold value; and estimating a bit value for each bit sample based on the determined second difference.

4. The method of claim 3, wherein:

each actual ADC value of the pair of actual ADC values comprises an n-bit word;

the step of determining for each bit sample the first voltage difference for each pair of actual ADC values comprises performing, in parallel for each pair of actual ADC values, an n-bit subtraction between the current ADC value and the previous ADC value; and the step of determining for each bit sample the second difference between the determined first voltage difference and the threshold value comprises performing, in parallel for each bit sample, an n-bit subtraction between the determined first voltage difference and the threshold value.

5. The method of claim 4, wherein each n-bit operation has propagation delay P, and wherein the fast symbol estimation module has a worst-case latency of P+(W*P), wherein P is a positive decimal.

6. The method of claim 1, wherein the step of generating a corrected bit value for each bit sample of the W bit samples comprises:
generating, based on the reconstructed ADC value and the actual ADC value, an error signature value corresponding to each bit sample; and
determining whether the estimated bit value corresponding to each bit sample is an incorrectly estimated bit value based on the corresponding error signature value, the first predetermined number of pre-cursor pulse response taps, the cursor pulse response tap, and the second predetermined number of post-cursor pulse response taps, and an error threshold value.

7. The method of claim 6, further comprising:
if the error signature value is less than or reaches the error threshold value, determining that the corresponding estimated bit value is correctly estimated; and
otherwise, if the error signature value exceeds the error threshold value, (i) determining that the corresponding estimated bit value is incorrectly estimated, and (ii) generating a corrected bit estimate value.

8. The method of claim 7, further comprising, if the corresponding estimated bit value is incorrectly estimated:
re-estimating the reconstructed ADC value based on the corrected bit estimate value; and
re-generating the error signature value based on the re-estimated reconstructed ADC value.

9. The method of claim 6, wherein the step of generating an error signature value corresponding to each bit sample comprises subtracting the reconstructed ADC value from the actual ADC value for each bit sample.

10. The method of claim 9, wherein:
for a correct bit estimate, b'[j], the error signature value is given by the equation e'[j]=|a[j]−a'[j]|; and
for an incorrect bit estimate, b'[j], the error signature value is given by the equation e''[j +k]=e'[j +k]−2$h_k$,
where e' is the error signature value, e'' is a corrected error signature value, a is the actual ADC value, a' is the reconstructed ADC value, j is an integer bit index of the bit sample, k is an integer tap index of the system, and h is a pulse response tap value.

11. The method of claim 1, wherein the step of estimating a reconstructed ADC value corresponding to each bit sample comprises:
summing, for each of one or more pulse response taps of the receiver:
each estimated bit value multiplied by the corresponding pulse response tap value.

12. The method of claim 11, wherein the reconstructed ADC value is given by the equation: a'[j]=$\Sigma_{taps}$b'[−i+j]×$h_i$, where a' is the reconstructed ADC value, j is an integer bit index of the bit sample, b' is the estimated bit value, i is an integer tap number index, and $h_i$ is the pulse response tap value.

13. The method of claim 6, further comprising:
adapting, based on the error signature values, tap values for each of one or more pulse response taps of the receiver.

14. The method of claim 1, wherein the communication channel is a long-reach serializer/deserializer (SERDES) communication channel.

15. A non-transitory machine-readable medium, having encoded thereon program code, wherein, when the program code is executed by a machine, the machine is configured to recover timing and data information from a signal received by a receiver of a communication system via a communication channel, comprising:
generate, by an analog-to-digital converter (ADC) of the receiver, the ADC operating at a baud rate of the communication channel, W actual ADC values, each actual ADC value corresponding to a bit sample of a window of W bit samples of the received signal, wherein W is a positive integer;
estimate, based on the W actual ADC values, an estimated bit value corresponding to each bit sample of the W bit samples, by a fast symbol estimation module of the receiver operating at a digital clock rate of the receiver;
provide the W estimated bit values to a timing recovery module of the receiver;
estimate, by an ADC reconstruction module of the receiver, a reconstructed ADC value corresponding to each bit sample of the W bit samples, the reconstructed ADC value based on the corresponding estimated bit value and (i) a first predetermined number of pre-cursor pulse response taps of the receiver, (ii) a cursor pulse response taps of the receiver, and (iii) a second predetermined number of post-cursor pulse response taps of the receiver; and
generate a corrected bit value for each bit sample of the W bit samples based on (i) the corresponding reconstructed ADC value, (ii) the corresponding estimated bit value, and (iii) the corresponding actual ADC value.

16. A communication system comprising:
a transmitter configured to transmit a signal over a communication channel to a receiver of the communication system;
a receiver configured to recover timing and data information from the received signal, wherein the receiver is configured to:
generate, by an analog-to-digital converter (ADC) configured to operate at a baud rate of the communication channel, W actual ADC values, each actual ADC value corresponding to a bit sample of a window of W bit samples of the received signal, wherein W is a positive integer;
estimate, based on the W actual ADC values, an estimated bit value corresponding to each bit sample of the W bit samples, by a fast symbol estimation module of the receiver, the fast symbol estimation module configured to operate at a digital clock rate of the receiver;
provide the W estimated bit values to a timing recovery module of the receiver;
estimate, by an ADC reconstruction module of the receiver, a reconstructed ADC value corresponding to each bit sample of the W bit samples, the reconstructed ADC value based on the corresponding estimated bit value and (i) a first predetermined number of precursor pulse response taps of the receiver, (ii) the cursor pulse response tap of the receiver, and (iii) a second predetermined number of post-cursor pulse response taps of the receiver; and
generate a corrected bit value for each bit sample of the W bit samples based on (i) the corresponding reconstructed ADC value, (ii) the corresponding estimated bit value, and (iii) the corresponding actual ADC value.

17. The communication system of claim 16, wherein the fast symbol estimation module is further configured to:
   determine for each bit sample a first voltage difference for each pair of actual ADC values of the W actual ADC values, each pair comprising a current ADC value and a previous ADC value;
   determine for each bit sample a second difference between the determined first voltage difference and a threshold value; and
   estimate a bit value for each bit sample based on the determined second difference.

18. The communication system of claim 16, wherein the receiver is further configured to:
   generate, based on the reconstructed ADC value and the actual ADC value, an error signature value corresponding to each bit sample;
   determine whether the estimated bit value corresponding to each bit sample is an incorrectly estimated bit value based on the error signature value, the first predetermined number of pre-cursor pulse response taps, the cursor pulse response tap, and the second predetermined number of post-cursor pulse response taps, and an error threshold value; and
   if the error signature value is less than or reaches the error threshold value, determine that the corresponding estimated bit value is correctly estimated;
   otherwise, if the error signature value exceeds the error threshold value, (i) determine that the corresponding estimated bit value is incorrectly estimated, and (ii) generate a corrected bit estimate value.

19. A receiver for recovering timing and data information from the received signal, the receiver comprising:
   an analog-to-digital converter (ADC) configured to (i) operate at a baud rate of the communication channel, and (ii) generate W actual ADC values, each actual ADC value corresponding to a bit sample of a window of W bit samples of the received signal, wherein W is a positive integer;
   a fast symbol estimation module configured to (i) estimate, based on the W actual ADC values, a bit value corresponding to each bit sample of the W bit samples, (ii) operate at a digital clock rate of the receiver, and (iii) provide the W estimated bit values to a timing recovery module of the receiver;
   an ADC reconstruction module configured to (a) estimate a reconstructed ADC value corresponding to each bit sample of the W bit samples, the reconstructed ADC value based on the corresponding estimated bit value and (i) a first predetermined number of pre-cursor pulse response taps of the receiver, (ii) the cursor pulse response tap of the receiver, and (iii) a second predetermined number of post-cursor pulse response taps of the receiver, and (b) generate a corrected bit value for each bit sample of the W bit samples based on (i) the corresponding reconstructed ADC value, (ii) the corresponding estimated bit value, and (iii) the corresponding actual ADC value.

20. The receiver of claim 19, wherein the fast symbol estimation module is further configured to:
   determine for each bit sample a first voltage difference for each pair of actual ADC values of the W actual ADC values, each pair comprising a current ADC value and a previous ADC value;
   determine for each bit sample a second difference between the determined first voltage difference and a threshold value; and
   estimate a bit value for each bit sample based on the determined second difference.

21. The receiver of claim 20, wherein the receiver is further configured to:
   generate, based on the reconstructed ADC value and the actual ADC value, an error signature value corresponding to each bit sample;
   determine whether the estimated bit value corresponding to each bit sample is an incorrectly estimated bit value based on the error signature value, the first predetermined number of pre-cursor pulse response taps, the cursor pulse response tap, and the second predetermined number of post-cursor pulse response taps, and an error threshold value; and
   if the error signature value is less than or reaches the error threshold value, determine that the corresponding estimated bit value is correctly estimated;
   otherwise, if the error signature value exceeds the error threshold value, (i) determine that the corresponding estimated bit value is incorrectly estimated, and (ii) generate a corrected bit estimate value.

22. The receiver of claim 20, wherein the digital clock rate is substantially equivalent to the baud rate divided by W.

23. The receiver of claim 20, wherein:
   each actual ADC value of the pair of actual ADC values comprises an n-bit word;
   the receiver is configured to perform, (i) in parallel for each pair of actual ADC values, an n-bit subtraction between the current ADC value and the previous ADC value, and (ii) in parallel for each bit sample, an n-bit subtraction between the first voltage difference and the threshold value.

24. The receiver of claim 21, wherein the receiver is configured to generate the error signature value by subtracting the reconstructed ADC value from the actual ADC value for each bit sample, wherein:
   for a correct bit estimate, b'[j], the error signature value is given by the equation $e'[j]=a[j]-a'[j]$; and
   for an incorrect bit estimate, b'[j], the error signature value is given by the equation $e''[j+k]=e'[j+k]-2h_k$,
   where e' is the error signature value, e'' is a corrected error signature value, a is the actual ADC value, a' is the reconstructed ADC value, j is an integer bit index of the bit sample, k is an integer tap index of the system, and h is a pulse response tap value.

25. The receiver of claim 21, wherein the receiver is configured to:
   adapt, based on the error signature values, tap values for each of one or more pulse response taps of the receiver.

26. The receiver of claim 21, wherein the communication channel is a long-reach serializer/deserializer (SERDES) communication channel.

* * * * *